United States Patent
Bernardi et al.

(10) Patent No.: US 8,667,482 B2
(45) Date of Patent: Mar. 4, 2014

(54) AUTOMATED APPLICATION MODELING FOR APPLICATION VIRTUALIZATION

(75) Inventors: Ara Bernardi, Mercer Island, WA (US); Sriram Sampath, Redmond, WA (US); John M Sheehan, Somerville, MA (US)

(73) Assignee: Microsoft Corporation, Redmond, WA (US)

( * ) Notice: Subject to any disclaimer, the term of this patent is extended or adjusted under 35 U.S.C. 154(b) by 1776 days.

(21) Appl. No.: 11/837,464

(22) Filed: Aug. 10, 2007

(65) Prior Publication Data

US 2009/0044170 A1  Feb. 12, 2009

(51) Int. Cl.
*G06F 9/445* (2006.01)
*G06F 9/44* (2006.01)

(52) U.S. Cl.
USPC ............ 717/174; 717/104; 717/105; 717/109

(58) Field of Classification Search
None
See application file for complete search history.

(56) References Cited

U.S. PATENT DOCUMENTS

| 7,987,432 | B1* | 7/2011 | Grechishkin et al. | 715/778 |
|---|---|---|---|---|
| 8,171,470 | B2* | 5/2012 | Goldman et al. | 717/174 |
| 8,245,222 | B2* | 8/2012 | Chalupa et al. | 717/174 |
| 8,307,358 | B1* | 11/2012 | Koryakina et al. | 717/174 |
| 8,464,245 | B2* | 6/2013 | Thornley | 717/174 |
| 8,549,513 | B2* | 10/2013 | Vinberg et al. | 717/174 |
| 2002/0065876 | A1* | 5/2002 | Chien et al. | 709/203 |
| 2004/0103261 | A1* | 5/2004 | Honda et al. | 711/202 |
| 2005/0005018 | A1 | 1/2005 | Datta | |
| 2005/0050545 | A1 | 3/2005 | Moakley | |
| 2005/0055686 | A1* | 3/2005 | Buban et al. | 717/170 |
| 2007/0168937 | A1* | 7/2007 | Mallick | 717/106 |
| 2007/0239944 | A1* | 10/2007 | Rupanagunta et al. | 711/147 |
| 2008/0052776 | A1* | 2/2008 | Prabhat et al. | 726/15 |
| 2008/0270973 | A1* | 10/2008 | Edwards et al. | 717/104 |
| 2008/0301759 | A1* | 12/2008 | Rivers et al. | 726/1 |
| 2009/0133013 | A1* | 5/2009 | Criddle et al. | 717/174 |
| 2010/0037206 | A1* | 2/2010 | Larimore et al. | 717/109 |
| 2012/0260229 | A1* | 10/2012 | Peraza et al. | 717/105 |

FOREIGN PATENT DOCUMENTS

KR  100735875  6/2007

OTHER PUBLICATIONS

Vonblohn et al., Virtualization of windows desktop applications, Oct. 2003, 3 pages.*
Huang et al., Efficiently tracking application interactions using light-weight virtualization, Oct. 2008, 9 pages.*
Exploring the SoftGrid Platform v4.1, retrieved from http://technet.microsoft.com/en-us/library/bb608285(d=printer).aspx on Mar. 24, 2013, 29 pages.

* cited by examiner

*Primary Examiner* — Thuy Dao
(74) *Attorney, Agent, or Firm* — Henry Gabryjelski; Kate Drakos; Micky Minhas

(57) ABSTRACT

Automated application modeling for application virtualization (auto-modeling) may be incorporated into an application installer and/or other suitable component of a computer operating system. Auto-modeling may be performed by an auto-modeling agent. The auto-modeling agent may employ one or more of multiple auto-modeling strategies. The auto-modeling agent may assess one or more of a particular application, application installation package and/or application environment in order to determine a suitable auto-modeling strategy. Auto-modeling strategies may include active auto-modeling and passive auto-modeling. Active auto-modeling strategies may require at least partial installation and/or execution of the application to be modeled, whereas passive auto-modeling may generate corresponding auto-modeling data independent of application installation and/or execution, for example, by obtaining suitable data from a corresponding application installation package.

19 Claims, 12 Drawing Sheets

AUTOMATED APPLICATION MODELING FOR APPLICATION VIRTUALIZATION

BACKGROUND

The provisioning of computing services to groups of people is a complex problem with a variety of solutions. One conventional solution is to install a particular set of applications at a personal computer (PC) of each person in the group. However, this can become unmanageable even for relatively small groups as, for example, particular specialists start demanding different application sets, and/or maintenance tasks such as security updates, bug fix patches, operating system service packs, and the like, begin to mount up.

A thin client approach to the problem can provide some relief. A relatively simple (i.e., thin) client program may be installed at each PC that provides user input to one or more central servers where the applications largely reside and execute (i.e., to one or more application servers). The servers may maintain a corresponding terminal session for each client connection, provide the user input to one or more applications of choice, and return the results (e.g., an updated graphical user interface or data corresponding thereto) back to the user. The thin client approach can ease management and maintenance burdens, but it has its own problems as well.

In particular, many applications are designed to operate under the initial scenario (i.e., the full install at PC scenario), and include behavior that can cause problems in other execution environments, for example, when multiple application instances execute simultaneously at one of the central servers. Such problems can range from outright failure to execute more than one application instance (e.g., because of a global name space conflict) to more subtle security issues such as unintended information leakage through the shared execution environment. To avoid often costly application redesign, such problems are commonly addressed with some level of isolating virtualization at the server.

There are numerous varieties of virtualization, however, for the purposes of this description, it will be sufficient to highlight two types, namely: operating system virtualization and application virtualization. Under operating system virtualization, multiple operating system instances may be maintained at a single hardware server. Under application virtualization, relatively fine-grained aspects of a single operating system instance may be replicated with lightweight copy-on-write techniques. Not only is application virtualization typically much more resource efficient than operating system virtualization, but operating system virtualization can reintroduce management and maintenance burdens that the thin client architecture is designed to ease in the first place. However, robust, high performance application virtualization typically requires a substantial modeling process for each application that, in effect, audits the application's impact on the host operating system. Even larger organizations can lack the time and/or resources to perform such application modeling and may be therefore denied the benefits of application virtualization and full benefits of the thin client architecture.

SUMMARY

Application modeling for application virtualization may be automated. In particular automated application modeling for application virtualization (auto-modeling) may be incorporated into an application installer and/or other suitable component of a computer operating system. Auto-modeling may be performed by an auto-modeling agent. The auto-modeling agent may employ one or more of multiple auto-modeling strategies. The auto-modeling agent may assess one or more of a particular application, application installation package and/or application environment in which the application is to be installed in order to determine a suitable auto-modeling strategy.

Auto-modeling strategies may include active auto-modeling and passive auto-modeling. Active auto-modeling strategies may require at least partial installation and/or execution of the application to be modeled for virtualization, whereas passive auto-modeling may generate corresponding auto-modeling data independent of application installation and/or execution, for example, by obtaining suitable data from a corresponding application installation package. In particular, The auto-modeling agent may perform active auto-modeling by directing an independent application modeler and/or an application installer, for example, in accordance with an auto-modeling rulebase.

Active auto-modeling may include the insertion of one or more application programming interface (API) hooks into one or more application programming interface elements. Calls to hooked application programming interface elements (e.g., by the application installer) may be intercepted and suitable data collected that may be transformed to generate application modeling data for virtualization. In particular, active auto-modeling utilizing application programming interface hooks may be suitable for incorporation into an install mode of a terminal services component of a computer operating system.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

Same numbers are used throughout the disclosure and figures to reference like components and features.

DETAILED DESCRIPTION

In an embodiment of the invention, application modeling for application virtualization may be automated. In particular, automated application modeling for application virtualization (auto-modeling) may be incorporated into an application installer and/or other suitable component of a computer operating system. An auto-modeling agent may assess a particular application, application installation package and/or an application environment in which the application is to be installed and determine a suitable auto-modeling strategy. Auto-modeling strategies may include active auto-modeling and passive auto-modeling. Active auto-modeling may require that the application be at least partially installed and/or executed in the application environment in order to generate application modeling data used for robust and high performance application virtualization. In contrast, passive auto-modeling may collect information required to generate the application modeling data from a suitable application installation package and independent of application installation and/or execution.

The auto-modeling agent may direct an application modeler, for example, in accordance with an auto-modeling rulebase. The auto-modeling rulebase may be updated from a central auto-modeling repository, for example, located on a public computer network. The auto-modeling agent may insert application programming interface (API) hooks (or shims), for example, into application programming interfaces of the computer operating system. The auto-modeling agent may use the application programming interface hooks to collect information required to generate the application modeling data. The use of application programming interface hooks may be particularly suitable when auto-modeling is incorporated into an install mode of a terminal services component of the computer operating system.

During active auto-modeling, changes made to an application environment by an application installation process may be monitored. Moreover, the choice of application environment may determine what changes are made. In an embodiment of the invention, active auto-modeling takes place relative to an application environment chosen from a specified set of one or more application environments including a default or baseline application environment corresponding to an expected minimum of pre-existing computing services, such as a minimum set of services provided by the computer operating system. Conventional application modeling for application virtualization typically may include further monitoring changes to the application environment made by the installed application during one or more initial executions of the application. In an embodiment of the invention, such further monitoring may be avoided by collecting corresponding information from application meta-data and/or a runtime auto-isolation policy.

Figure 1:
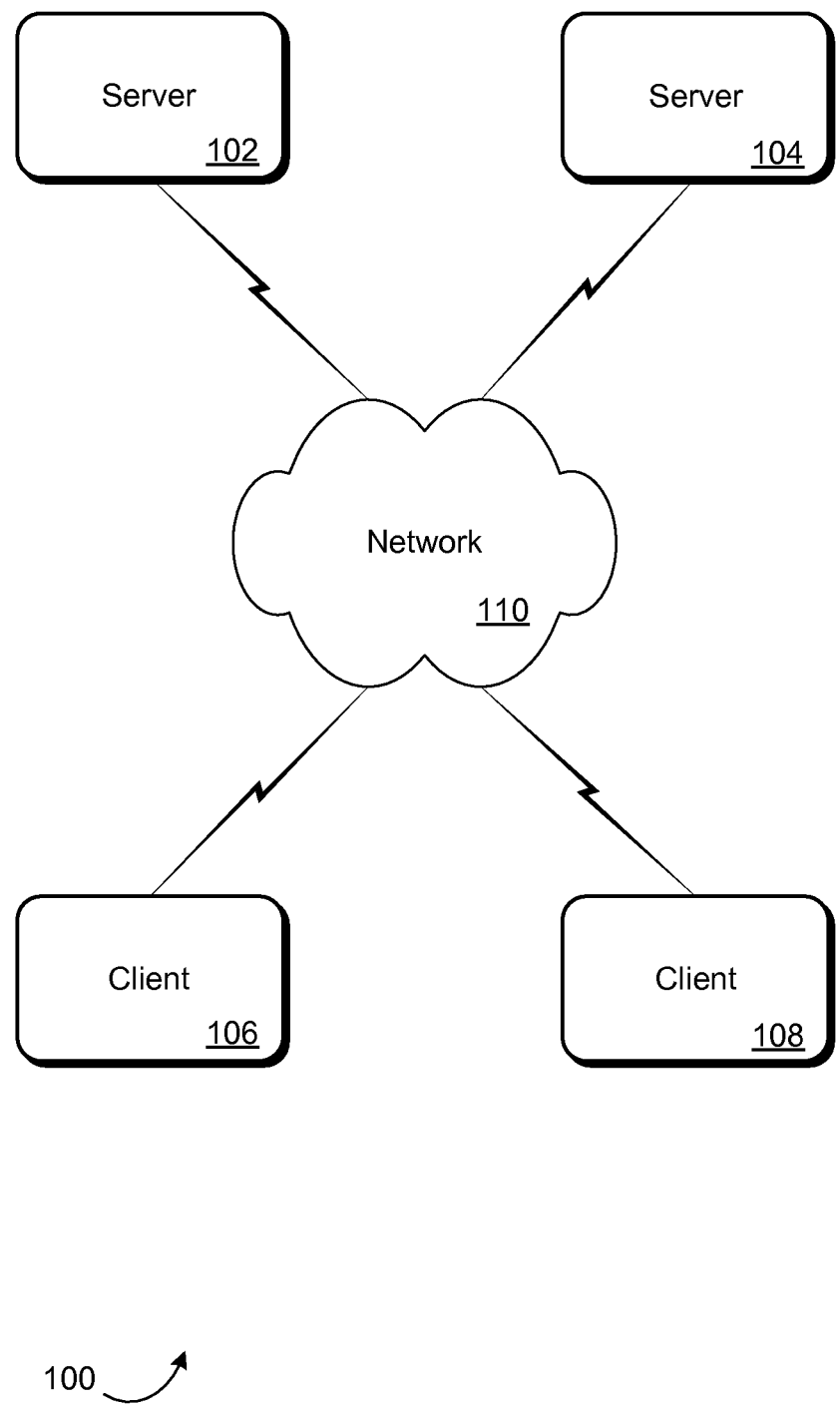
FIG. 1 is a schematic diagram depicting an example computing environment suitable for incorporating aspects of the invention.

Before describing aspects of auto-modeling in accordance with an embodiment to the invention in more detail, it will be helpful to have reference to an example computing environment suitable for incorporating such. FIG. 1 depicts a suitable computing environment 100. The computing environment 100 depicts four computers 102, 104, 106, 108 connected by a network 110. For clarity, two of the computers 102, 104 are designated as servers, and two of the computers 106, 108 are designated as clients. Embodiments of the invention are not so limited and may include any suitable number of computers, servers and/or clients. Furthermore, as will be apparent to one of skill in the art, any of the computers 102, 104, 106, 108 may perform in multiple roles so that, for example, the computer 104 may change roles to become a client or act as both server and client simultaneously.

The computers 102, 104, 106, 108 may be any suitable computing device. Examples of suitable computing devices include mainframes, minicomputers, desktop computers, personal computers (PCs), workstations, portable computers, laptop computers, tablet computers, personal digital assistants (PDAs), mobile telephones, programmable consumer electronics devices, routers, gateways, switches, hubs, and suitable combinations thereof. The computers 102, 104, 106, 108 may include one or more processing units capable of executing instructions to perform tasks, as well as one or more types of computer-readable media such as volatile and/or non-volatile memory capable of storing data, computer programs and/or computer program components. Such computer programs and components may include executable instructions, structured data and/or unstructured data organized into modules, routines and/or any suitable programmatic object. Such computer programs and components may be created by and/or incorporate any suitable computer programming language.

The computers 102, 104, 106, 108 may include a wide variety of input/output (I/O) devices not shown in FIG. 1 such as keyboards, keypads, touchpads, mice, trackballs, pens, joysticks, gamepads, scanners, cameras, microphones, monitors, liquid crystal displays (LCDs), light emitting diodes (LEDs), printers and/or speakers. Examples of computer-readable media suitable for reading by the computers 102, 104, 106, 108 include any one or more of magnetic media (such as hard disks), optical media such as compact disks (CDs) and communication media. Communication media may include any one or more of wired communication media such as copper wire, coaxial cable and optical fiber, as well as wireless communication media such as electro-magnetic media including radio, microwave, infra-red and laser light. In an embodiment of the invention, computer-readable media is tangible.

For clarity, embodiments of the invention may be described herein with reference to symbolic operations such as those of a computer programming language. Such symbolic operations and any data that they act upon correspond to physical states of components and changes in components of computing devices such as the computers 102, 104, 106, 108 in a manner well understood by one of skill in the art. In an embodiment of the invention, each such operation and its associated data may be fully implemented in hardware.

The network 110 may include any suitable network element and/or communication media. A computing device is an example of a suitable network element. The network 110 may incorporate any suitable network topology. Examples of suitable network topologies include simple point-to-point, star topology, self organizing peer-to-peer topologies and combinations thereof. Furthermore, the network 110 may employ any suitable network protocol to establish and/or maintain connectivity between the computers 102, 104, 106, 108. Examples of suitable network protocols include transmission control protocols (TCP), internet protocols (IP), remote desktop protocols (RDP), and suitable combinations thereof.

Figure 2:
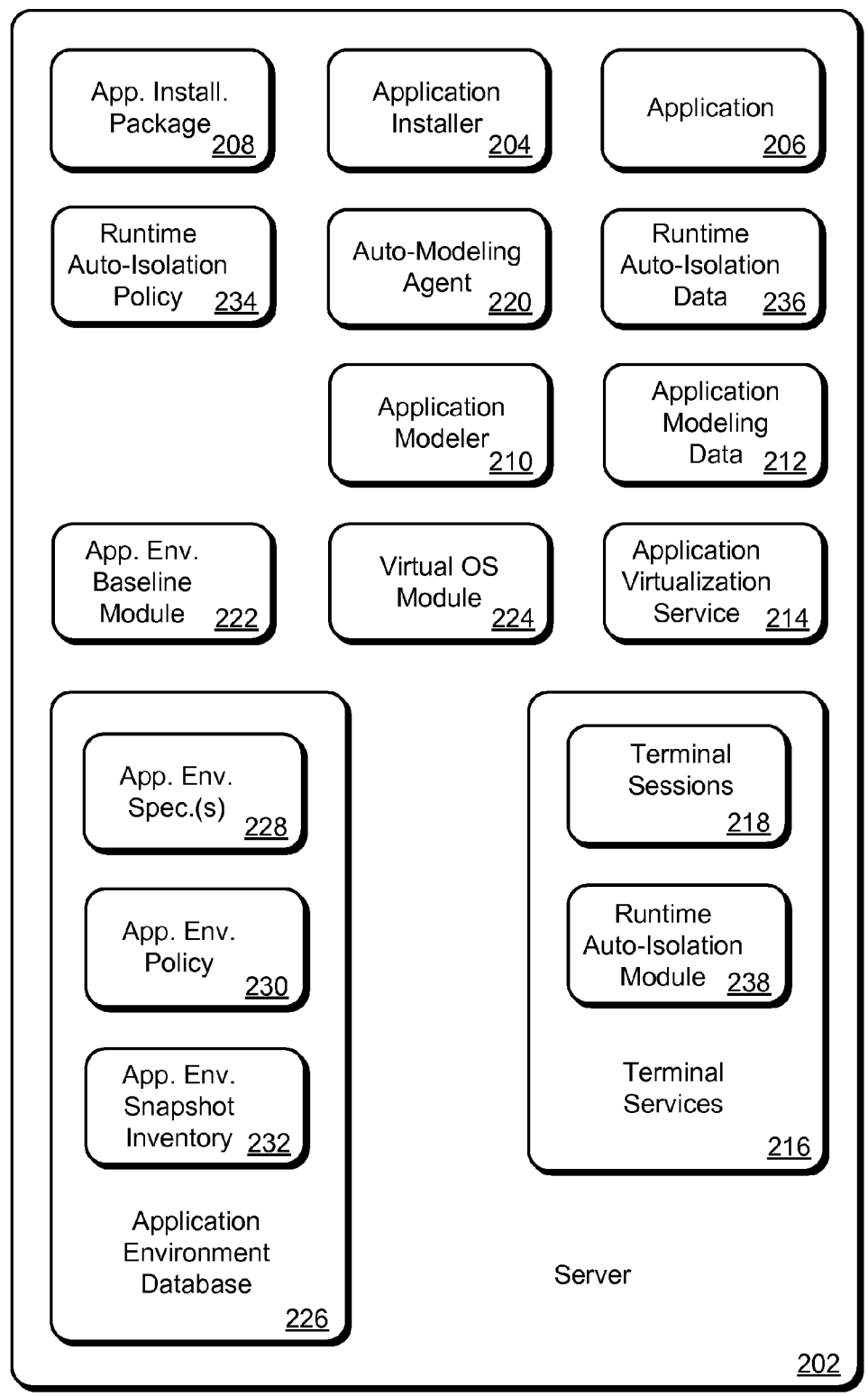
FIG. 2 is a schematic diagram depicting an example server incorporating auto-modeling in accordance with an embodiment of the invention.

Auto-modeling may be incorporated into any suitable computer such as computers 102, 104, 106, 108. However, in an embodiment of the invention, auto-modeling provides greater benefits when incorporated into a server, and particularly an application server, at least by enabling automated application virtualization for served applications. Furthermore, in an embodiment of the invention, the server example includes more features, and the description therefore proceeds in the context of the server example with the understanding that various described features will be applicable to other examples. FIG. 2 depicts an example server 202 incorporating auto-modeling in accordance with an embodiment of the invention. The server 202 may incorporate any suitable feature of the servers 102, 104 (FIG. 1).

The server 202 may include an application installer 204 capable of installing an application 206, for example, from an application installation package 208. For clarity, this example shows only one application 206 and one corresponding application installation package 208. However, each embodiment of the invention is not so limited and the server 202 may include any suitable number of applications and application installation packages. Furthermore, the correspondence between applications and application installation packages need not be one-to-one, for example, a single application installation package may correspond to multiple installed applications, and a single application may require multiple application installation packages for installation. The application installation package 208 may include the application installer 204 and/or data corresponding thereto, for example, a self-installing or bootstrap portion that installs and/or instantiates the application installer 204. The application 206 may be any suitable computing application.

The server 202 may further include an application modeler 210 capable of modeling the application 206 for virtualization and producing corresponding application modeling data 212. The application modeling data 212 may include structured data used by an application virtualization service 214 to provide application virtualization for the application 206. Application modelers such as application sequencers capable of application sequencing, application modeling data such as sequencing data generated by application sequencers, and application virtualization services such as application virtualization services that virtualize applications based at least in part on sequencing data are well known in the art, and only some of their details are highlighted herein. For example, the application modeling data 212 may include one or more structured data files corresponding to the application 206. The application modeling data 212 may further include structured data not directly relevant to application virtualization.

The server 202 may still further include a terminal services component 216 capable of providing clients such as the clients 106, 108 (FIG. 1) with access to functionality of the application 206. Terminal services such as those provided by the terminal services component 216 are well known in the art, and only some of their details are highlighted herein. Each client 106, 108 may establish one or more terminal sessions 218 with the terminal services component 216 for accessing application 206 functionality. From within the terminal sessions 218, the clients 106, 108 may request an instance of the application 206 with which to interact. In response, the terminal services component 216 may instantiate (i.e., open, load, associate with a process, begin a thread of execution, etc) the application 206. In an embodiment of the invention, the terminal services component 216 may virtualize the application 206 based on the application modeling data 212. For example, the terminal services component 216 may instantiate the application 206 within, and/or place an application 206 instance within, an isolating application virtualization instance (a virtualization "bubble") instantiated by the application virtualization service 214 based on the application modeling data 212 for the application 206. In an embodiment of the invention, the terminal services component 216 may incorporate the application virtualization service 214.

In an embodiment of the invention, the server 202 includes an auto-modeling agent 220. The auto-modeling agent 220 may generate, and/or cause to be generated, the application modeling data 212 for the application 206. The auto-modeling agent 220 may operate in a passive mode (i.e., perform passive auto-modeling), generating the application modeling data 212 based on the application installation package 208 without requiring that the application 206 be installed. The auto-modeling agent 220 may operate in an active mode (i.e., perform active auto-modeling), for example, configuring and/or directing the application installer 204 and the application modeler 210 to generate the application modeling data 212.

The auto-modeling agent 220 may be incorporated into the application installer 204 and/or the application modeler 210. Alternatively, the auto-modeling agent 220 may interact with and/or be incorporated into the terminal services component 216, and in particular, provide services during an install mode of the terminal services component 216 (e.g., a mode of operation in which the terminal services component 216 allows system level modifications to the server 202 from within one of the terminal sessions 218). The auto-modeling agent 220 may insert application programming interface (API) hooks into selected application programming interfaces of an operating system (not shown in FIG. 2) of the server 202, for example, in response to an application installation event such as the start of application installation by the application installer 204 or the terminal services component 216 transitioning to the install mode. The application installer 204 may access (i.e., call) the operating system application programming interfaces to install the application 206. The inserted application programming interface hooks may enable the auto-modeling agent 220 to intercept application programming interface calls by the application installer 204 and/or the application 206, and thereby collect information required to generate the application modeling data 212.

During active auto-modeling, the installation process for the application 206 may be monitored, for example, by the application modeler 210. As part of the installation process, an application environment into which the application is to be installed may be assessed, for example, by the application installer 204. The application environment may include the particular configuration of the operating system of the server 202 as well as any applications, services, device drivers, service packs, patches, and so on, that may be already installed, and any suitable aspect of the server 202 that may impact installed application 206 behavior. The application environment assessment may significantly influence actions taken (and therefore monitored) during installation, which may, in turn, influence the quality of the application modeling data 212 generated for the application 206.

For example, the application environment may be assessed as including a particular set of components needed by the application 206. Since the application environment already includes the set of components, the application installer 204 may not install them and, as a result, the application modeling data 212 may not reference the components. If the application modeling data 212 does not reference the components, a corresponding application virtualization instance instantiated by the application virtualization service 214 may not provide adequate virtualization with respect to the components and/or system (i.e., server 202) resources referenced by the components. For example, the application virtualization instance may not be able to compensate if the components are updated or deleted, compromising application 206 integrity.

In an embodiment of the invention, the auto-modeling agent 220 may direct an application environment baseline module 222 to instantiate a baseline (i.e., well defined and typically minimal) application environment in which application 206 installation takes place. For example, the application environment baseline module 222 may direct a virtual operating system (OS) module 224 to instantiate an operating system instance independent from the operating system of the server 202 (i.e., a virtual operating system) using operating system virtualization techniques. Such operating system virtualization techniques are well known in the art, and only some of their details are highlighted herein.

The application environment baseline module 222 may have reference to an application environment database 226 storing one or more application environment specifications 228. The application environment baseline module 222 may direct the virtual operating system module 224 to instantiate, and may further configure, the virtual operating system in accordance with one of the application environment specifications 228. Application environment specifications 228 may specify any suitable aspect of application environments that may impact installed application 206 behavior. Application environments may be created, updated and/or deleted by the application environment baseline module 222 in accordance with an application environment policy 230.

The application environment baseline module 222 may further create new application environment specifications 228 from existing application environments. For example, the application environment baseline module 222 may collect data from a particular application environment in accordance with an application environment snapshot inventory 232. The application environment snapshot inventory 232 may reference aspects of the application environment for which a corresponding statement of the new application environment specification should be generated. The application environment snapshot inventory 232 may further include search or query statements that may be used to search application environment namespaces for candidate system resources for inclusion in the new application environment specification. The application environment snapshot inventory 232 may still further include filters to reduce and/or enhance the set of candidate system resources to be specified. The search or query statements may be specified with any suitable query language. The filters may include any suitable set filter.

For some applications, installation monitoring may be sufficient for the application modeler 210 to generate application modeling data 212 usable by the application virtualization service 214 to create high quality application virtualization instances. However, for other applications, installation monitoring alone may be insufficient. In particular, higher quality application virtualization instances may be created for some applications if the application modeler 210 further monitors changes to the application environment made by the application 206 during a first instantiation and execution (i.e., a first run) of the application 206 or, for example, the first several runs. In an embodiment of the invention, however, it is desirable to avoid running the application 206 during auto-modeling and, in particular, during passive auto-modeling.

To avoid running the application 206 to collect additional application modeling data 212 (i.e., runtime application modeling data), the auto-modeling agent 220 may collect data corresponding to the runtime application modeling data, or some suitable subset thereof, from an alternate source. For example, the application installation package 208 may include explicit specification of such data and/or a runtime auto-isolation policy 234 may specify such data for the particular application installation package 208 or a class of application installation packages to which the application installation package 208 belongs. The auto-modeling agent 220 may transform the alternatively collected data to generate the additional runtime application modeling data for the application modeling data 212 set or, in an embodiment of the invention, to generate runtime auto-isolation data 236 for the application 206 independent of the application modeling data 212.

The server 202 may maintain one or more namespaces that organize (e.g., hierarchically) names referencing system (i.e., server 202) resources. For example, file systems, registries of configuration information, distributed common object models (DCOM), and system-wide object managers in general may each have an associated namespace. In particular, the runtime auto-isolation data 236 may specify one or more system namespaces to be protected, for example, write protected and/or virtualized to varying degrees.

The terminal services component 216 may include a runtime auto-isolation module 238 capable of using the runtime auto-isolation data 236 to provide for runtime aspects of application virtualization and, in particular, for virtualization of specified protected namespaces. For example, the runtime auto-isolation module 238 may detect access attempts for specified protected namespaces and, depending on the access type (e.g., write attempt) and/or the access attempt result (e.g., access denied), may redirect the access attempt to a lightweight application 206 instance specific replica of the namespace, and/or resource(s) referenced by the namespace, implemented with copy-on-write techniques. The runtime auto-isolation module 238 may utilize aspects of the application virtualization service 214 to implement aspects of protected namespace virtualization and, in an embodiment of the invention, the runtime auto-isolation module 238 may be incorporated into the application virtualization service 214.

Figure 3:
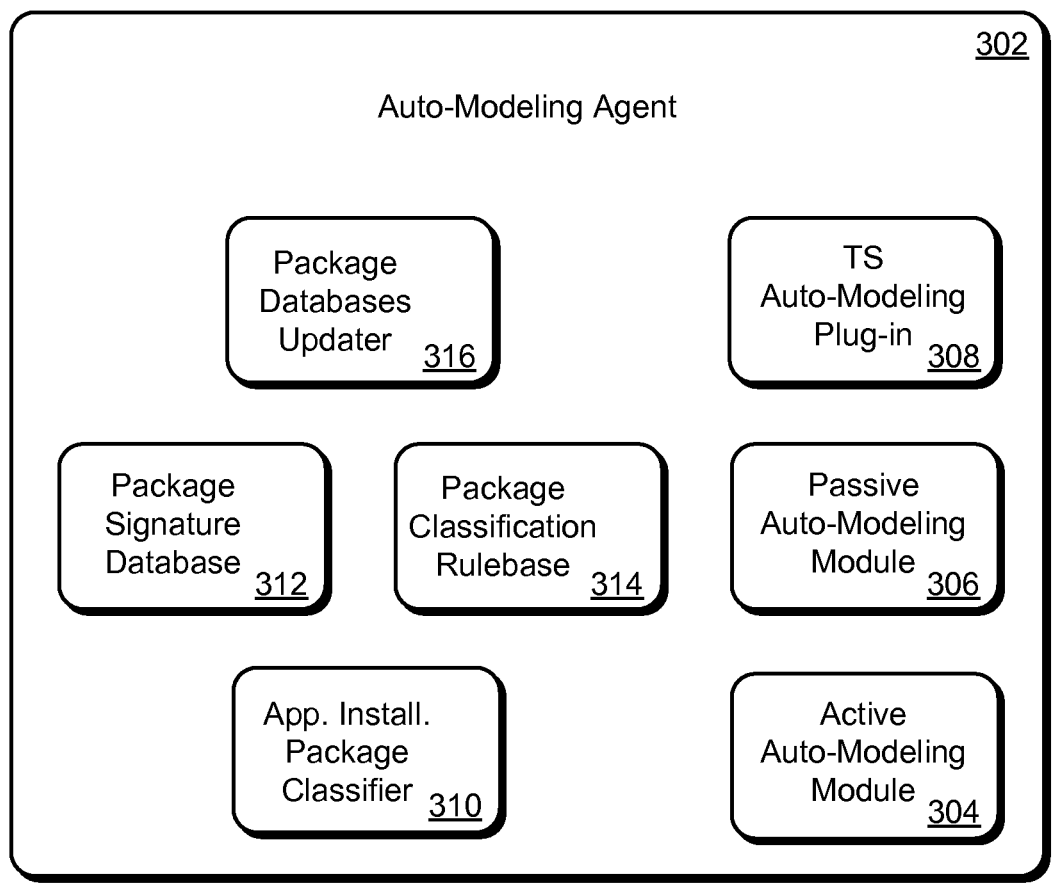
FIG. 3 is a schematic diagram depicting an example architecture for an auto-modeling agent in accordance with an embodiment of the invention.

Before describing procedures that may be performed by the components depicted in FIG. 2 in more detail, it will be helpful to describe additional details of the auto-modeling agent 220. Accordingly, FIG. 3 depicts an example architecture 300 for an auto-modeling agent 302. In an embodiment of the invention, the example architecture 300 is suitable for the auto-modeling agent 220 of FIG. 2.

The auto-modeling agent 302 may include an active auto-modeling module 304 for performing aspects of active auto-modeling, a passive auto-modeling module 306 for performing aspects of passive auto-modeling, and a terminal services (TS) auto-modeling plug-in 308 for integrating aspects of auto-modeling with the terminal services component 216 (FIG. 2). An auto-modeling agent in accordance with an embodiment of the invention need not include each of these three 304, 306, 308, and may include any suitable combination thereof. The active auto-modeling module 304, the passive auto-modeling module 306, and the terminal service auto-modeling plug-in 308 are described below in more detail with reference to FIGS. 4, 5 and 6 respectively.

The auto-modeling agent 302 may determine which type of auto-modeling to use (e.g., passive auto-modeling or active auto-modeling) based on, for example, a type of the application installation package 208 (FIG. 2), presence of one or more server 202 components (e.g., the terminal services component 206), and/or any suitable aspect of the application installation environment (i.e., the application environment of the application installer 204). The auto-modeling agent 302 may include an application installation package classifier 310 to facilitate application installation package 208 type determination. The application installation package classifier 310 may parse the application installation package 208 to obtain application installation package classification data.

The application installation package classifier 310 may determine an application installation package signature based on the application installation package classification data. The application installation package classifier 310 may attempt to match the determined application installation package signature against application installation package signatures in a package signature database 312. A resulting match may be associated with a package signature database 312 record specifying a particular application installation package classification or, for example, further application installation package classification data. If there is no match, or a match that does not result in an immediate classification, the application installation package classifier 310 may use the collected application installation package classification data to determine the application installation package 206 (FIG. 2) classification in accordance with a package classification rulebase 314.

The package classification rulebase 314 may include package classification rules specified with any suitable rule specification language including any suitable programming language. The package classification rulebase 314 may include conditional rules having conditions dependent on the collected application installation package classification data. The package classification rulebase 314 may further include rules independent of the collected application installation package classification data and, in particular, a default rule such as a rule corresponding to "by default, use active auto-modeling."

The auto-modeling agent 302 may further include a package databases updater 316 capable of updating the package signature database 312 and the package classification rulebase 314 from an auto-modeling repository (not shown in FIG. 3), for example, according to an update schedule or in response to an update event. The auto-modeling repository may be located at a server remote from the server 202 (FIG. 2), and in particular at a server accessible over a public network. For example, if the server 202 corresponds to the server 102 (FIG. 1), the auto-modeling repository may be located at the server 104, and the network 110 may be a public network such as the internet. An example auto-modeling repository is described below in more detail with reference to FIG. 7.

Figure 4:
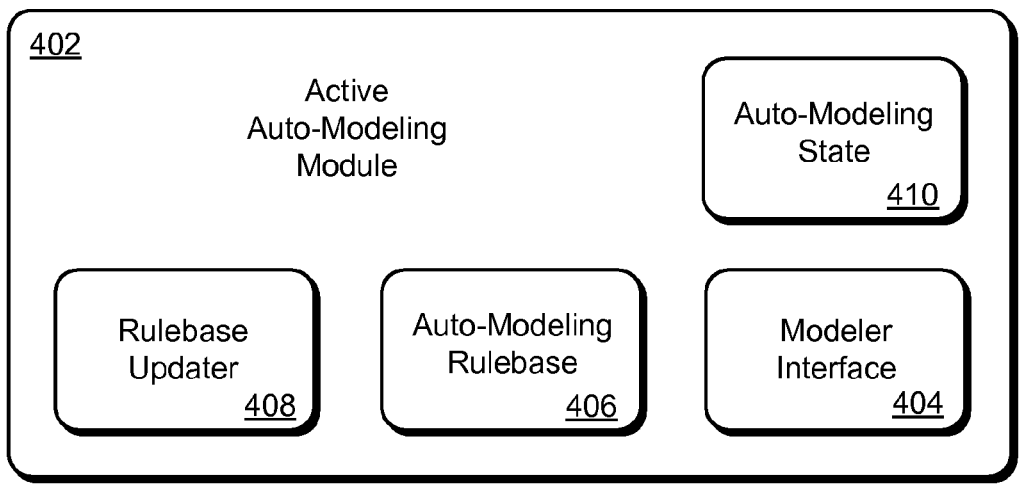
FIG. 4 is a schematic diagram depicting an example active auto-modeling module in accordance with an embodiment of the invention.

It may be that the auto-modeling agent 302 determines that active auto-modeling should be used to model the application 206 (FIG. 2) for virtualization, for example, based on the application installation package classification determined by the application installation package classifier 310 for the application installation package 208. FIG. 4 depicts an example active auto-modeling module 402 in accordance with an embodiment of the invention. The active auto-modeling module 402 is an example of the active auto-modeling module 304 of FIG. 3.

The active auto-modeling module 402 may include a modeler interface 404 capable of interfacing with the application modeler 210 (FIG. 2). The modeler interface 404 may provide access to functionality of the application modeler 210 at any suitable level. For example, the application modeler 210 may expose one or more application programming interfaces providing access to application modeler 210 functionality, and the modeler interface 404 may translate auto-modeling commands, instructions and/or directions ("auto-modeling directions") to corresponding application modeler 210 application programming interface calls. Alternatively, the application modeler 210 may provide access to functionality at a user interface level, for example, through user editable configuration files and/or graphical user interface dialogs. The modeler interface 404 may translate auto-modeling directions to corresponding user interface commands, actions, edits, instructions and/or directions.

The modeler interface 404 may similarly receive and translate feedback from the application modeler 210 (FIG. 2), for example, responsive to the auto-modeling directions, as well as subscribe to application modeler 210 events. The active auto-modeling module 402 may issue auto-modeling directions and/or respond to application modeler 210 feedback or events in accordance with an auto-modeling rulebase 406. The auto-modeling rulebase 406 may include auto-modeling rules specified with any suitable rule specification language including any suitable programming language. The auto-modeling rulebase 406 may be updated, for example, from the auto-modeling repository, by a rulebase updater 408. Rulebase updates may occur according to an update schedule or, for example, responsive to an update event.

One or more rules of the auto-modeling rulebase 406, for example conditional rules, may depend upon a state of an application installation process performed by the application installer 204 (FIG. 2) and/or a state of an application modeling process performed by the application modeler 210. The active auto-modeling module 402 may maintain a corresponding auto-modeling state 410, for example, based on feedback and/or events received by the modeler interface 404. The auto-modeling rulebase 406 may include one or more auto-modeling rules for updating the auto-modeling state 410.

Figure 5:
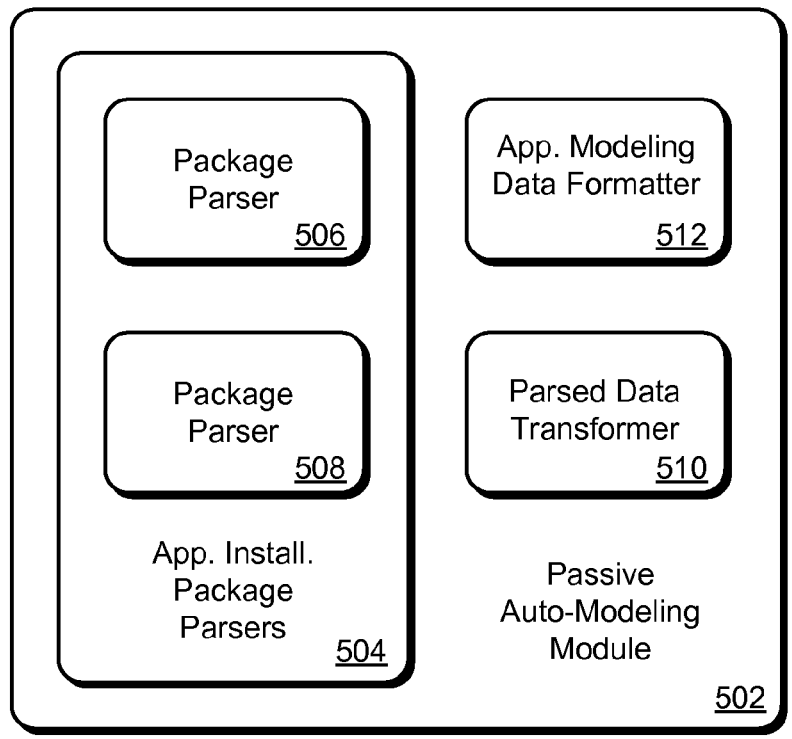
FIG. 5 is a schematic diagram depicting an example passive auto-modeling module in accordance with an embodiment of the invention.

It may be that the auto-modeling agent 302 (FIG. 3) determines that passive auto-modeling should be used to model the application 206 (FIG. 2) for virtualization, for example, based on the application installation package classification determined by the application installation package classifier 310 for the application installation package 208. FIG. 5 depicts an example passive auto-modeling module 502 in accordance with an embodiment of the invention. The passive auto-modeling module 502 is an example of the passive auto-modeling module 306 of FIG. 3.

The passive auto-modeling module 502 may include one or more application installation package parsers 504 capable of parsing application installation packages such as the application installation package 208 (FIG. 2) for data corresponding to application modeling data 212. The application installation packages parsers 504 may include package parsers 506, 508 for any suitable application installation package including compressed (e.g., zipped) application installation packages, archived application installation packages (e.g., with a unix tar command), application installation packages with particular formats such as Microsoft® Windows® Installer format (i.e., MSI format), and/or any suitable combination thereof. The passive auto-modeling module 502 may make the application installation package parsers 504 available to other components of the auto-modeling agent 302 (FIG. 3), for example, the application installation package classifier 310.

The passive auto-modeling module 502 may further include a parsed data transformer 510 for transforming data parsed from the application installation package 208 (FIG. 2) into one or more data structures more suitable for formatting into the application modeling data 212. The parsed data transformer 510 may apply any suitable data transformation including linear data mappings and translations, as well as more sophisticated multiple pass transformations. The transformed data may be formatted by an application modeling data formatter 512 into a suitable application modeling data 212 format, for example, an application modeling data 212 format corresponding to a format of application modeling data 212 generated by the application modeler 210 and/or used by the application virtualization service 214 to instantiate an application virtualization instance suitable for the application 206.

Figure 6:
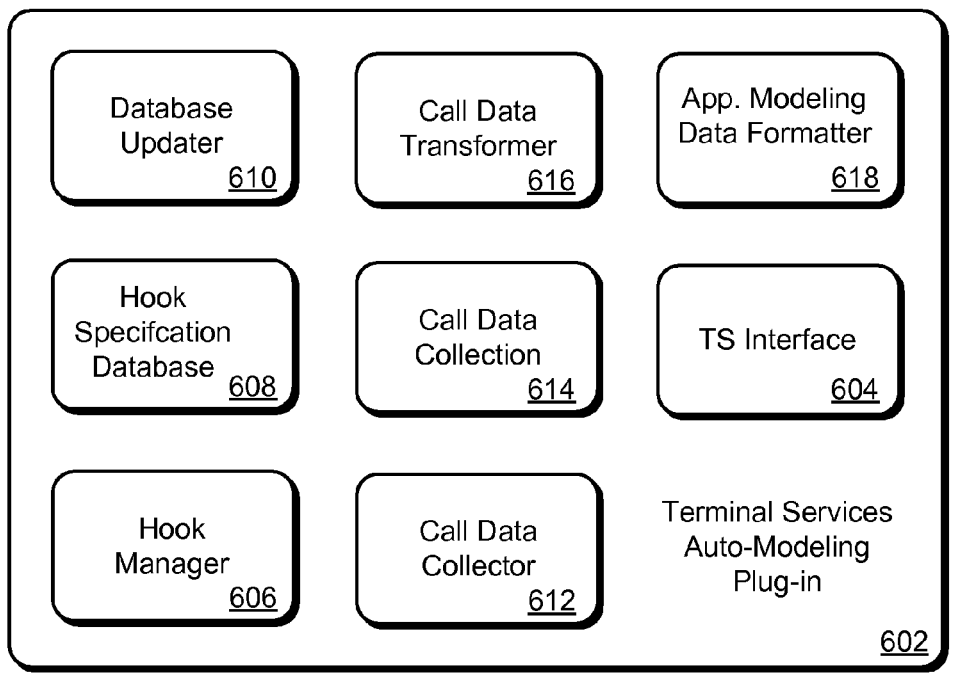
FIG. 6 is a schematic diagram depicting an example terminal services auto-modeling plug-in in accordance with an embodiment of the invention.

It may be that the auto-modeling agent 302 (FIG. 3) determines that the terminal services auto-modeling plug-in 308 should be used to model the application 206 (FIG. 2) for virtualization, for example, based on detection of, and/or a request by, the terminal services component 216. FIG. 6 depicts an example terminal services auto-modeling plug-in 602 in accordance with an embodiment of the invention. The terminal services auto-modeling plug-in 602 is an example of the terminal services auto-modeling plug-in 308 of FIG. 3.

The terminal services auto-modeling plug-in 602 may include a terminal services interface 604 capable of interfacing with the terminal services component 216 (FIG. 2). For example, the terminal services interface 604 may utilize one or more application programming interfaces exposed by the terminal services component 216 to access terminal services component 216 functionality. Furthermore, the terminal services interface 604 may expose one or more auto-modeling application programming interfaces for use by the terminal services component 216. Such auto-modeling application programming interfaces may provide access to any suitable aspect of auto-modeling agent 302 (FIG. 3) functionality and, in particular, may enable the terminal services component 216 to direct the terminal services auto-modeling plug-in 602 to take steps to generate the application modeling data 212 for the application 206.

The terminal services auto-modeling plug-in 602 may subscribe to terminal services component 216 (FIG. 2) events, and in particular to notifications of transition to and from the install mode of the terminal services component 216. For terminal services component 216 events of interest to the terminal services auto-modeling plug-in 602 that are not explicitly published by the terminal services component 216, the terminal services auto-modeling plug-in 602 may insert application programming interface hooks into elements of corresponding terminal services component 216 application programming interfaces, and generate the events when the hooked application programming interface elements are called.

The terminal services auto-modeling plug-in 602 may include a hook manager 606 capable of inserting and deleting application programming interface hooks into and from elements of application programming interfaces. For example, responsive to detection of the terminal services component 216 (FIG. 2) transitioning to the install mode, the hook manager 606 may insert application programming interface hooks into one or more elements of one or more application programming interfaces of the application environment into which the application 206 is to be installed, such as application programming interfaces of the operating system of the server 202. Similarly, responsive to detection of the terminal services component 216 transitioning from the install mode, the hook manager 606 may delete the previously inserted application programming interface hooks.

The hook manager 606 may insert and/or delete application programming interface hooks in accordance with entries in a hook specification database 608. For example, the hook specification database 608 may include sets of application programming interface hook specifications corresponding to particular directions and/or events that may be received from the terminal services component 216 (FIG. 2) and, responsive to a particular direction and/or event, the hook manager 606 may insert or delete (as appropriate) an application programming interface hook corresponding to each application programming interface hook specification in the associated set. As further examples, the hook specification database 608 may include sets of application programming interface hook specifications corresponding to classes of application installation packages, for example, as determined by the application installation package classifier 310 (FIG. 3), and/or any suitable aspect of the application environment into which the application 206 is/is to be installed. The terminal services auto-modeling plug-in 602 may further include a database updater 610 capable of updating the hook specification database 608, for example, from the auto-modeling repository.

The terminal services auto-modeling plug-in 602 may intercept calls to application programming interface elements with inserted application programming interface hooks (i.e., hooked application programming interface elements). In particular, a call data collector 612 of the terminal services auto-modeling plug-in 602 may examine parameters of calls to hooked elements before the calls are passed on to their original destination. The call data collector 612 may collect (i.e., select, copy, etc) ones of the call parameters to store in a call data collection 614. In particular, the call data collector may collect call parameters to store in the call data collection 614 that may be used to generate application modeling data 212 (FIG. 2) for the application 206 (e.g., during installation of the application 206). Each application programming interface hook specification may include specification of one or more call parameters to be collected by the call data collector 612.

The terminal services auto-modeling plug-in 602 may further a call data transformer 616 capable of transforming the call data collection 614 into one or more data structures suitable for formatting into the application modeling data 212 (FIG. 2). The call data transformer 616 may apply any suitable data transformation to the call data collection 614 including linear data mappings and translations, as well as more sophisticated multiple pass transformations. The transformed data may be formatted by an application modeling data formatter 618 into a suitable application modeling data 212 format, for example, an application modeling data 212 format corresponding to a format of application modeling data 212 generated by the application modeler 210 and/or used by the application virtualization service 214 to instantiate an application virtualization instance suitable for the application 206. The application modeling data formatter 618 may be a replica of the application modeling data formatter 512 (FIG. 5), or a same component shared by the terminal services auto-modeling plug-in 602 and the passive auto-modeling module 502.

Figure 7:
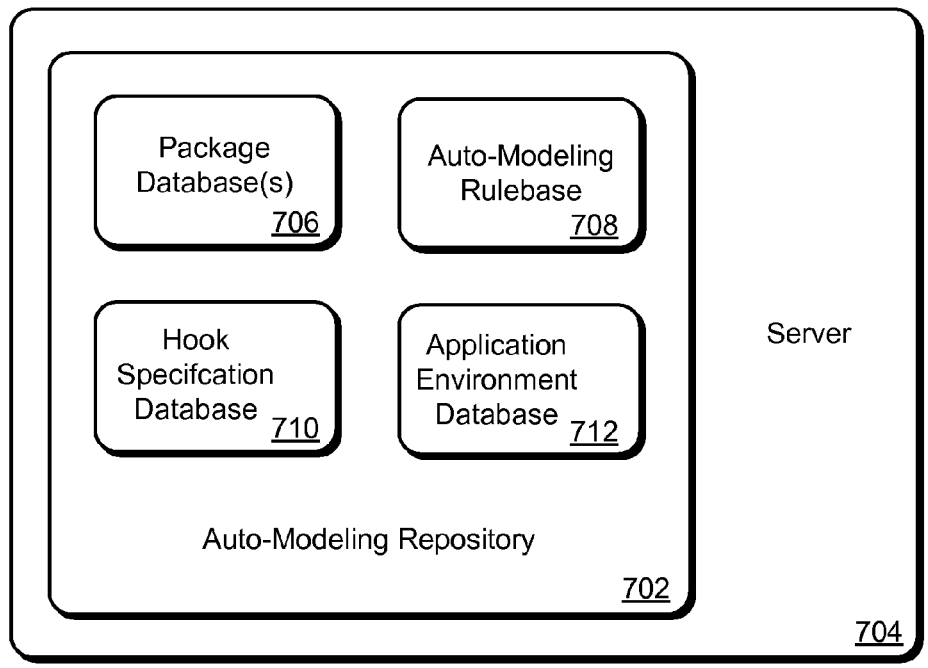
FIG. 7 is a schematic diagram depicting an example auto-modeling repository in accordance with an embodiment of the invention.

As described above, each of the auto-modeling agent 302 (FIG. 3), the active auto-modeling module 402 (FIG. 4) and the terminal services auto-modeling plug-in 602 include a database 312, 608 and/or rulebase 314, 406 that may be updated from an auto-modeling repository that may be located at a server remote from the server 202 (FIG. 2). FIG. 7 depicts an example auto-modeling repository 702 in accordance with an embodiment of the invention. The auto-modeling repository 702 may be hosted by a server 704 that may be different from the server 202. For example, the server 202 may correspond to the server 102 (FIG. 1) and the server 704 may correspond to the server 104. Alternatively, the auto-modeling repository 702 may be a distributed database (i.e., distributed across two or more servers), for example, implemented with peer-to-peer or overlay network techniques well known in the art.

The auto-modeling repository 702 may include one or more package databases 706 from which the package signature database 312 (FIG. 3) and/or the package classification rulebase 314 may be updated, for example, by the package databases updater 316. The auto-modeling repository 702 may include an auto-modeling rulebase 708 from which the auto-modeling rulebase 406 (FIG. 4) may be updated, for example, by the rulebase updater 408. The auto-modeling repository 702 may include a hook specification database 710 from which the hook specification database 608 (FIG. 6) may be updated, for example, by the database updater 610. The auto-modeling repository 702 may further include an application environment database 712 from which the application environment database 226 (FIG. 2) may be updated, for example, by the application environment baseline module 222.

The auto-modeling repository 702 databases 706, 708, 710, 712 may have a same format as corresponding databases 226, 312, 314, 406, 608 (FIGS. 2, 3, 4 and 6) that update from the auto-modeling repository 702. However, each embodiment of the invention is not so limited, and the auto-modeling repository 702 databases 706, 708, 710, 712 may have any suitable format including, for example, a format optimized for updating and/or synchronization. The auto-modeling repository 702 may be configured to accept and process update requests, for example, from the database updaters 222, 316, 408, 610. In addition, the database updaters 222, 316, 408, 610 may be configured to accept and process update notifications from the auto-modeling repository 702. For example, update notifications may include database 226, 312, 314, 406, 608 updates and/or trigger an update request from the notified database updater 222, 316, 408, 610.

Figure 8:
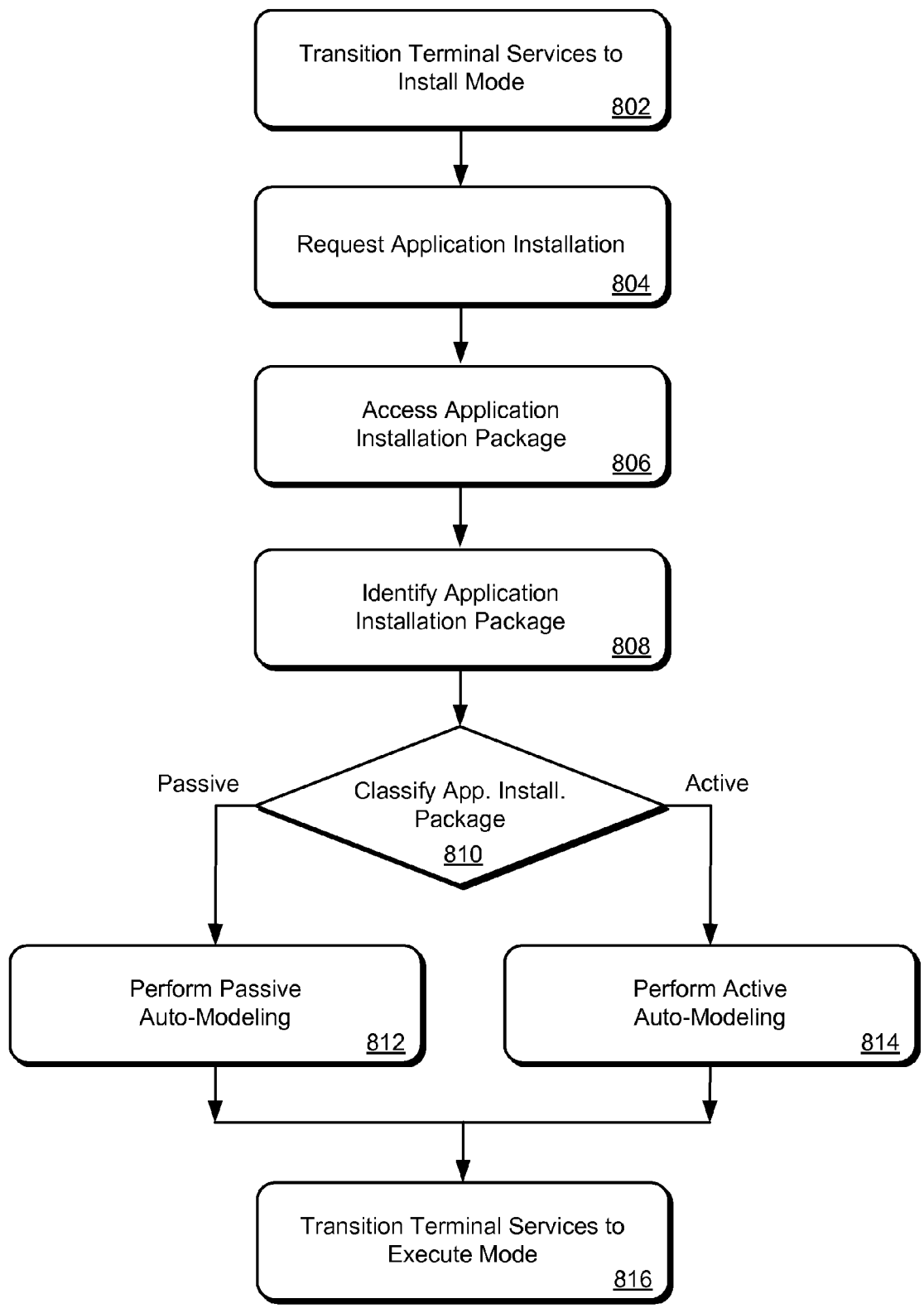
FIG. 8 is a flowchart depicting example steps for auto-modeling in accordance with an embodiment of the invention.

Having described structural aspects of architectures and components in accordance with an embodiment of the invention in some detail, the description now turns to procedures and steps that may be performed, for example, by the architectures and/or components. FIG. 8 depicts steps that are part of a relatively complex example that will serve to illustrate aspects of application auto-modeling in accordance with an embodiment of the invention. In this example, both passive auto-modeling and active auto-modeling are available, and a choice between them is made based on information corresponding to the application installation package 208 (FIG. 2). Furthermore, auto-modeling takes place as part of the install mode of the terminal services component 216.

As described above, the terminal services component 216 (FIG. 2) may manage access to a set of applications such as the application 206 from within terminal sessions 218. Furthermore, the terminal services component 216 may have an install mode for managing changes to the set of applications. For example, when in the install mode, the terminal services component 216 may allow changes to the configuration of the server 202 that affect each of the terminal sessions 218, whereas, when in an operating or execute mode the terminal services component 216 may limit changes to the configuration of the server 202 to changes that affect only a particular one of the terminal sessions 218. In particular, in the install mode, the terminal services component 216 may allow installation of a new application (e.g., the application 206) accessible from each of the terminal sessions 218. In some instances, installation outside the install mode may not be prevented, but may result in undesirable (e.g., unmanaged) modifications to the configuration of the server 202.

In the example described with reference to FIG. 2, the application environment into which the application 206 is installed includes at least some aspects of the server 202. Multiple unrelated processes may occur during installation and/or modeling of the application 206, each of which may make changes to aspects of the server 202. Such unrelated changes may contaminate the modeling of the application 206 and lower its quality. In an embodiment of the invention, the install mode of the terminal services component 216 may insulate the application modeler 210 from detecting changes to the application environment that are unrelated to installation of the application 206, for example, using application virtualization techniques.

At step 802, the terminal services component 216 (FIG. 2) may transition to the install mode. For example, the terminal services component 216 may transition to the install mode in response to an explicit request (or command) of a user of the server 202. At step 804, an application installation may be requested, for example, the user of the server 202 may request the application installer 204 to install the application 206 from the application installation package 208. The request to transition to the install mode and the request to install the application 206 may be independent, or they may be integral. For example, the application installer 204 may automatically request that the terminal services component 216 transition to the install mode responsive to the request to install the application 206 and/or detection of the terminal services component 216.

At step 806, the application installation package 208 (FIG. 2) may be accessed, for example, by the auto-modeling agent 220. The auto-modeling agent 220 may access the application installation package 208, for example, responsive to a request by the application installer 204, the terminal services component 216, or to detection of the transition to install mode by the terminal services component 216. Accessing the application installation package 208 may, for example, include locating, opening and/or reading elements of the application installation package 208.

At step 808, the application installation package 208 (FIG. 2) may be identified. For example, the auto-modeling agent 220 may associate the application installation package 208 with a unique identifier. The auto-modeling agent 220 may identify the application installation package 208 with the package signature database 312 (FIG. 3). For example, the package signature database 312 may be searched for an identifying match with information corresponding to the application installation package 208 obtained at step 806.

At step 810, the application installation package 208 (FIG. 2) may be classified. For example, the auto-modeling agent 220 may associate the application installation package 208 with one or more application installation package classifications including classifications corresponding to "suitable for passive auto-modeling" and "suitable for active auto-modeling." The auto-modeling agent 220 may classify the application installation package 208 according to the package classification rulebase 314 (FIG. 3) and/or the identification obtained at step 808. If the application installation package 208 is classified as "suitable for passive auto-modeling" a procedure incorporating the steps depicted in FIG. 8 may progress to step 812. Otherwise, the procedure may progress to step 814.

At step 812, passive auto-modeling may be performed. For example, the auto-modeling agent 220 (FIG. 2) may passively auto-model the application 206 using information from the application installation package 208. Passive auto-modeling in accordance with an embodiment of the invention is described in more detail below with reference to FIG. 13. At step 814, active auto-modeling may be performed. For example, the auto-modeling agent 220 may actively auto-model the application 206 during installation of the application 206 by the application installer 204 from the application installation package 208. Active auto-modeling in accordance with an embodiment of the invention is described below in more detail with reference to FIGS. 9, 10, 11 and 12.

At step 816, the terminal service component 216 (FIG. 2) may transition to the execute mode. For example, the terminal services component 216 may transition to the execute mode in response to an explicit request (or command) of the user of the server 202. Alternatively, the terminal services component 216 may transition to the execute mode responsive to a request (or command) automatically issued by the application installer 204, for example, on completion of application 206 installation and/or auto-modeling.

Figure 9:
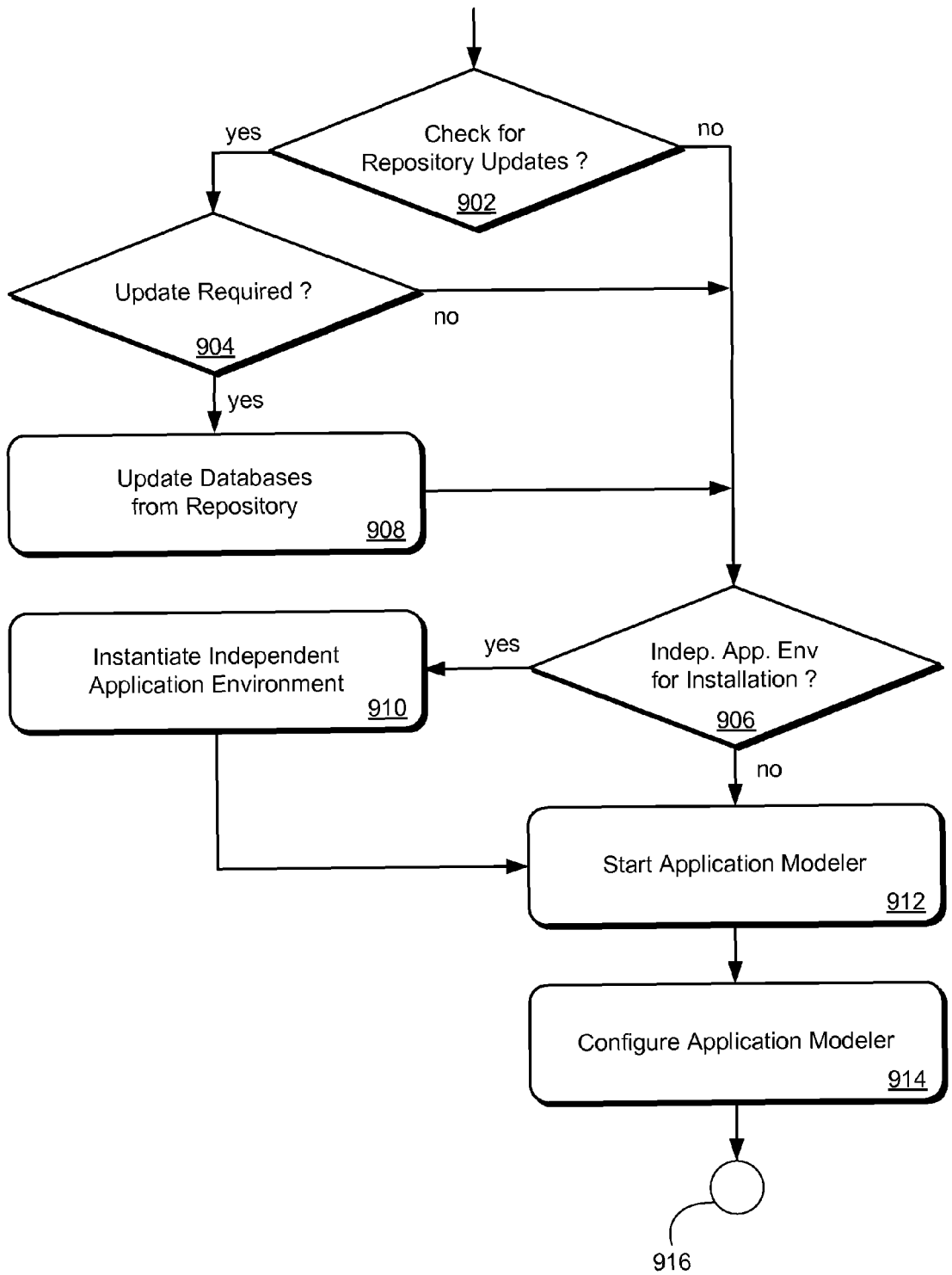
FIG. 9 is a flowchart depicting example steps for active auto-modeling in accordance with an embodiment of the invention.
Figure 10:
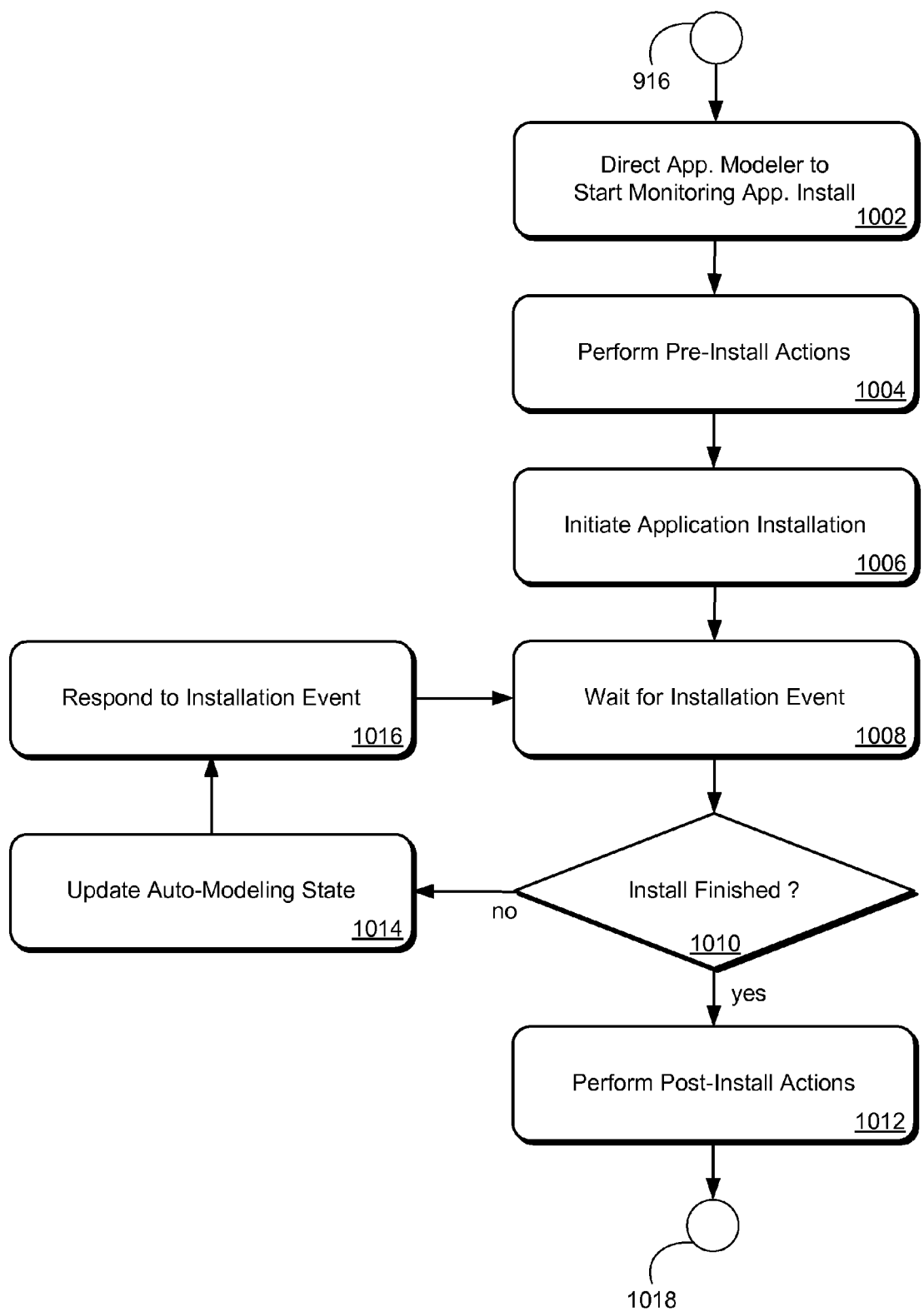
FIG. 10 is a flowchart depicting further example steps for active auto-modeling in accordance with an embodiment of the invention.
Figure 11:
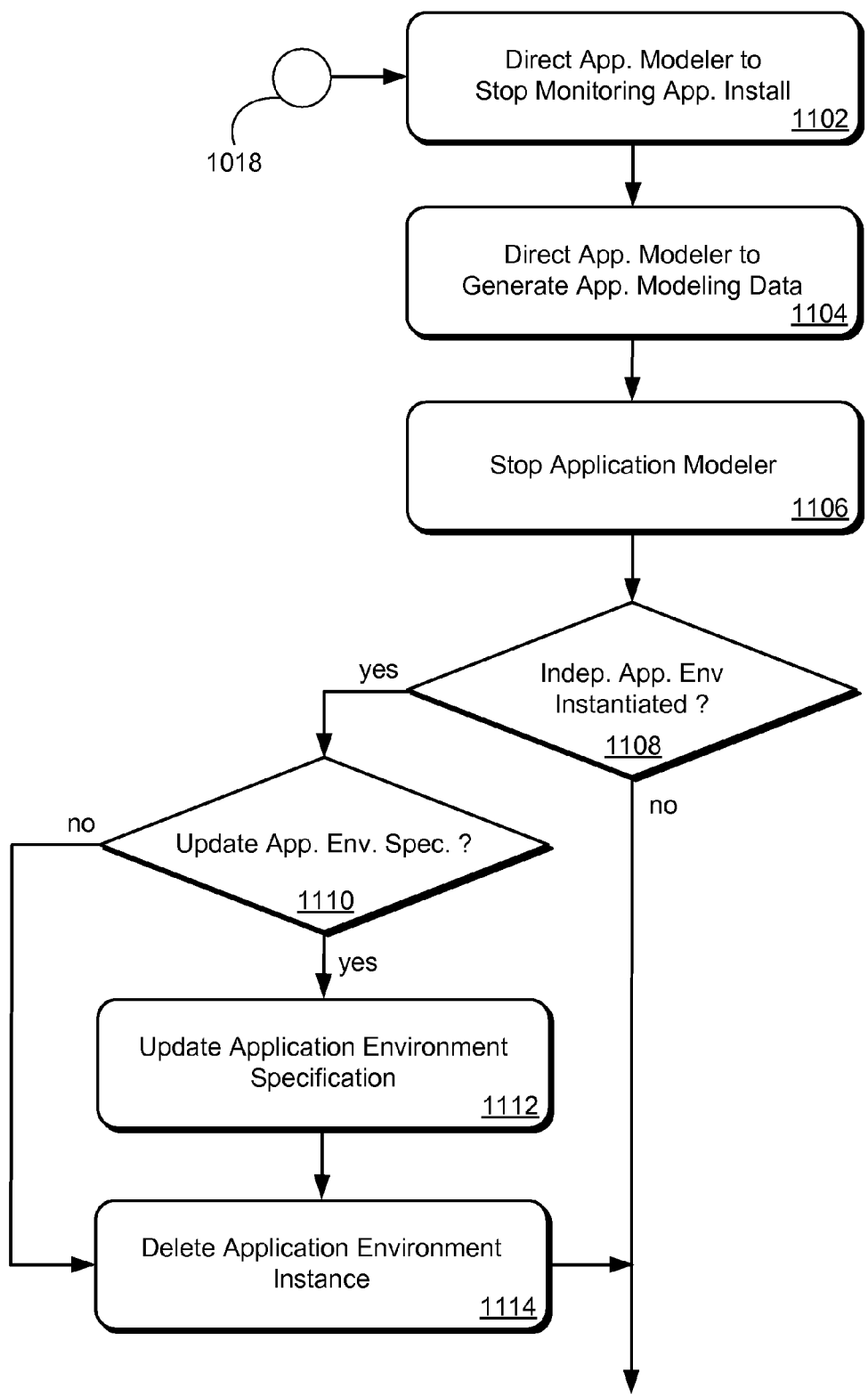
FIG. 11 is a flowchart depicting still further example steps for active auto-modeling in accordance with an embodiment of the invention.
Figure 12:
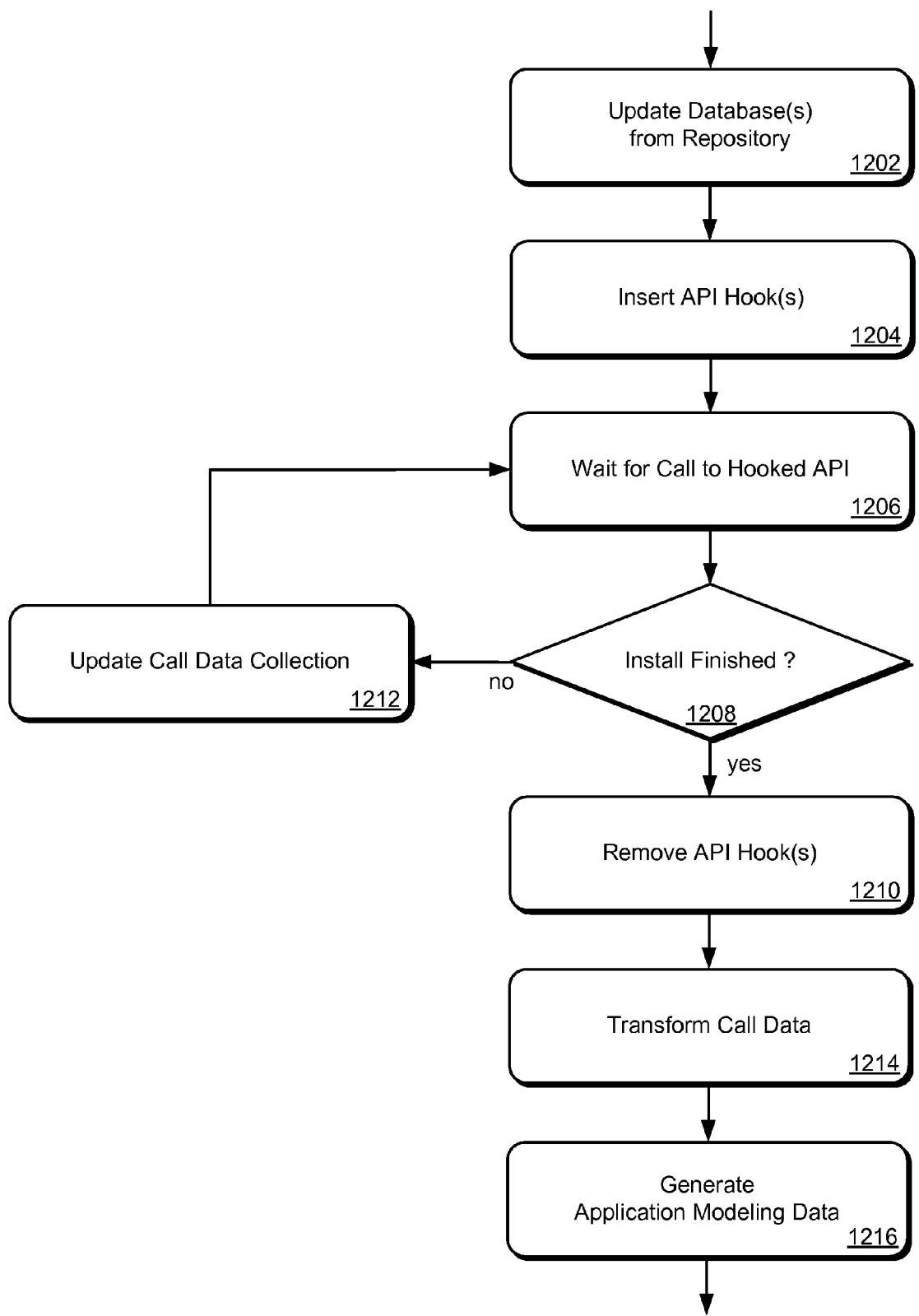
FIG. 12 is a flowchart depicting example steps for active auto-modeling using application programming interface hooks in accordance with an embodiment of the invention.

Passive auto-modeling and active auto-modeling may differ significantly. Active auto-modeling will be described first in more detail as it is the more complex auto-modeling example and will provide additional context. FIGS. 9, 10 and 11 depict example steps for active auto-modeling in accordance with an embodiment of the invention. FIG. 12 depicts example alternative steps for active auto-modeling in accordance with an embodiment of the invention.

Various databases 226, 608 (FIGS. 2 and 6) and rulebases 406 (FIG. 4) may be accessed as part of active auto-modeling. As described above, such databases 226, 608 and rulebases 406 may be updated from the auto-modeling repository 702 (FIG. 7). Updates may occur, for example, according to an update schedule and/or responsive to auto-modeling events such as active auto-modeling initiation. At step 902, it may be determined if it is appropriate to check for a repository update. For example, the active auto-modeling module 402 (FIG. 4) may check if an event has occurred that indicates an update from the auto-modeling repository 702 may be desirable. Such events may include an update schedule event, an auto-modeling event such as auto-modeling initiation, and/or receipt of a notification from the auto-modeling repository 702. The application environment baseline module 222 (FIG. 2) and the terminal services auto-modeling plug-in 602 (FIG. 6) may make similar checks. If it is determined that it is appropriate to check for a repository update, a procedure incorporating the steps depicted in FIG. 9 may progress to step 904. Otherwise, the procedure may progress to step 906.

At step 904, it may be determined if a repository update is required. For example, the rulebase updater 408 (FIG. 4) of the active auto-modeling module 402 may determine if the auto-modeling rulebase 708 (FIG. 7) at the auto-modeling repository 702 has changed since the auto-modeling rulebase 406 was last updated. If the auto-modeling repository 702 has not provided a notification indicating such a change, the rulebase updater 408 and the auto-modeling repository 702 may exchange messages enabling comparison of a state of the auto-modeling rulebase 406 and the auto-modeling rulebase 708, for example, the rulebase updater 408 or the auto-modeling repository 702 may compare timestamps, cryptographic signatures, and/or any suitable auto-modeling rulebase 406, 708 characteristic. Similarly, the application environment baseline module 222 (FIG. 2) may determine if the application environment database 712 has changed since the application environment database 226 was updated, and the database updater 610 (FIG. 6) of the terminal services auto-modeling plug-in 602 may determine if the hook specification database 710 has changed since the hook specification database 608 was last updated. If it is determined that a repository update is required, the procedure may progress to step 908. Otherwise, the procedure may progress to step 906.

At step 908, one or more databases and/or rulebases may be updated. For example, the rulebase updater 408 (FIG. 4) of the active auto-modeling module 402 may update the auto-modeling rulebase 406 from the auto-modeling rulebase 708 (FIG. 7) at the auto-modeling repository 702. Similarly, the application environment baseline module 222 (FIG. 2) may update the application environment database 226 from the application environment database 712, and the database updater 610 (FIG. 6) of the terminal services auto-modeling plug-in 602 may update the hook specification database 608 from the hook specification database 710. Database and/or rulebase updates may be implemented with any suitable database update and/or synchronization technique including simple copy, transmission of differences only, and distributed replication techniques.

The active auto-modeling module 402 (FIG. 4) may be configured to actively auto-model the application 206 (FIG. 2) relative to an application environment that is independent of a default application environment provided by the server 202. At step 906, it may be determined if such an independent application environment is desired for application 206 installation. For example, the auto-modeling rulebase 406 may specify whether or not such an independent application environment is desirable for the application 206, application installation package 208 and/or class of application installation package 208 as determined by the application installation package classifier 310 (FIG. 3). Alternatively, or in addition, the determination may be based on the application environment policy 230. If the independent application environment is desired, the procedure may progress to step 910. Otherwise, the procedure may progress to step 912.

At step 910, the independent application environment may be instantiated. For example, the application environment baseline module 222 (FIG. 2) may direct the virtual operating system module 224 to instantiate the independent application environment in accordance with one or more application environment specifications 228 and/or the application environment policy 230. The application environment baseline module 222 may chose a particular one of the application environment specifications 228 for instantiation based on information from the auto-modeling agent 302 (FIG. 3) such as one or more classifications of the application installation package 208, information from the active auto-modeling module 402 (FIG. 4) such as an application environment designation specified by the auto-modeling rulebase 406, and/or information from the application environment policy 230 such as a designation of a baseline application environment to be instantiated.

At step 912, the application modeler 210 (FIG. 2) may be started. For example, the active auto-modeling module 402 (FIG. 4) may direct the application modeler 210 to start. Starting the application modeler 210 may include accessing, opening, loading and/or running the application modeler 210. At step 914, the application modeler 210 may be configured. For example, the active auto-modeling module 402 may configure the application modeler 210 to model the application 206 as it is installed from the application installation package 208. The active auto-modeling module 402 may configure the application modeler 210 according to one or more auto-modeling rules in the auto-modeling rulebase 406 that are associated with the application 206 and/or the application installation package 208. In particular, the application modeler 210 may be configured to ignore, for modeling purposes, aspects of the application environment into which the application 206 is to be installed (e.g., the application environment instantiated at step 910).

The circle 916 (FIGS. 9 and 10) is a diagrammatic device connecting the steps depicted by FIG. 9 and the steps depicted by FIG. 10. In particular the circle 916 indicates that the procedure may progress from step 914 to step 1002. At step 1002, the application modeler 210 (FIG. 2) may be directed to start monitoring application installation. For example, the application modeler 210 may have an explicit monitoring mode in which the application modeler 210 monitors changes made to the application environment during installation of the application 206, and the active auto-modeling module 402 (FIG. 4) may direct the application modeler 210 to transition to the monitoring mode.

At step 1004, one or more pre-installation actions may be performed. For example, the active auto-modeling module 402 (FIG. 4) may perform one or more pre-installation actions in accordance with one or more auto-modeling rules of the auto-modeling rulebase 406 that are associated with the application 206 (FIG. 2) and/or the application installation package 208. Pre-installation actions may include application environment configuration, file system modification, modifications to one or more registries of configuration information, installation of patches, security updates and/or service packs, and/or any suitable action preparing the application environment for installation.

At step 1006, application installation may be initiated. For example, the active auto-modeling module 402 (FIG. 4) may direct the application installer 204 (FIG. 2) to begin installing the application 206 from the application installation package 208. Initiating application installation may include accessing, opening, loading and/or running the application installer 204.

At step 1008, the active auto-modeling procedure may wait for an installation event. For example, the active auto-modeling module 402 (FIG. 4) may wait for the application installer 204 (FIG. 2) to request direction. Installation events may include actions performed by the application installer 204, the application 206, the application environment into which the application 206 is being installed, the application modeler 210, the terminal services component 216 and/or components thereof. In particular, installation events may include requests for direction, for example, requests corresponding to graphical user interface (GUI) dialogs that would normally (e.g., without the active auto-modeling module 402) require response by a user of the server 202. The installation events may further include an indication that the installation is finished, that is, that the application 206 has been installed. For example, the indication may be that the application installer 204 started at step 1006 may exit.

At step 1010, it may be determined if the installation has finished. For example, the active auto-modeling module 402 (FIG. 4) may detect the indication that the installation is finished (i.e., the "install finished" installation event). If the installation has finished, the procedure may progress to step 1012. Otherwise, the procedure may progress to step 1014.

At step 1014, an auto-modeling state may be updated. For example, the active auto-modeling module 402 (FIG. 4) may update the auto-modeling state 410 in accordance with the installation event and/or one or more auto-modeling rules of the auto-modeling rulebase 406. At step 1016, a response to the installation event may be made. For example, the active auto-modeling module 402 may respond to the installation event in accordance with one or more auto-modeling rules of the auto-modeling rulebase 406 and/or the auto-modeling state 410. In particular, the active auto-modeling module 402 may respond to requests for direction, for example, by the auto-modeling agent 220 (FIG. 2). Such response may be effected with a component interface of any suitable level including an application programming interface, an application configuration interface such as a registry of configuration information and/or a configuration file, and/or a user interface such as a graphical user interface. Such response may include a restart of the operating system of the server 202 and/or of the independent application environment instantiated at step 910 (FIG. 9).

Having responded, the procedure may return to step 1008 to wait for the next installation event. At some point the "install finished" installation event will occur (by means of an installation timeout if not otherwise) and the procedure may progress to step 1012. At step 1012, one or more post-installation actions may be performed. For example, the active auto-modeling module 402 (FIG. 4) may perform one or more post-installation actions in accordance with one or more auto-modeling rules of the auto-modeling rulebase 406 that are associated with the application 206 (FIG. 2) and/or the application installation package 208. Post-installation actions may include application environment configuration, file system modification, modifications to one or more registries of configuration information, installation of patches, security updates and/or service packs, running the application 206 and/or any suitable server 202 component and/or utility, and/or any suitable action facilitating high quality modeling of the application 206.

The circle 1018 (FIGS. 10 and 11) is a diagrammatic device connecting the steps depicted by FIG. 10 and the steps depicted by FIG. 11. In particular the circle 1018 indicates that the procedure may progress from step 1012 to step 1102. At step 1102, the application modeler 210 (FIG. 2) may be directed to stop monitoring application installation. For example, the active auto-modeling module 402 (FIG. 4) may direct the application modeler 210 to transition from the monitoring mode entered at step 1002. In an embodiment of the invention, maintaining the application modeler 210 monitoring mode while the pre-install and post-install actions of steps 1004 and 1012 (FIG. 10) are performed enables higher quality modeling of the application 206.

At step 1104, the application modeler 210 (FIG. 2) may be directed to generate application modeling data 212 for the application 206. For example, the active auto-modeling module 402 (FIG. 4) may so direct the application modeler 210. It may be that the application modeler 210 generates the application modeling data 212 automatically upon transitioning from the monitoring mode, in which case step 1102 incorporates step 1104. At step 1106, the application modeler 210 may be stopped. For example, the active auto-modeling module 402 may direct the application modeler to stop. Stopping the application modeler 210 may include ceasing to run the application modeler 210 and/or unloading the application modeler 210 from server 202 memory.

At step 1108, it may be determined if an independent application environment was instantiated, for example, at step 910 (FIG. 9). The application environment baseline module 222 (FIG. 2) may keep track of application environments instantiated by the virtual operating system module 224, and particularly application environments instantiated by the virtual operating system module 224 at the direction of the application environment baseline module 222. If an independent application environment was instantiated, the procedure may progress to step 1110. Otherwise, the procedure may progress to steps beyond those depicted in FIGS. 9, 10 and 11.

At step 1110, it may be determined if the application environment specification corresponding to the instantiated application environment should be updated, for example, to reflect one or more of the changes made to the instantiated application environment during installation of the application 206 (FIG. 2) and/or to include the newly installed application 206 itself. The application environment policy 230 may include one or more application environment policy elements specifying whether and how to update the application environment specification corresponding to the instantiated application environment, and the determination of step 1110 may be made in accordance with the application environment policy 230. If it is determined that the application environment specification corresponding to the instantiated application environment should be updated, the procedure may progress to step 1112. Otherwise, the procedure may progress to step 1114.

At step 1112, the application environment specification corresponding to the instantiated application environment may be updated. For example, the application environment baseline module 222 (FIG. 2) may update the application environment specification corresponding to the instantiated application environment in accordance with the application environment policy 230. At step 1114, the instantiated application environment may be deleted. For example, the application environment baseline module 222 may direct the virtual operating system module 224 to delete the application environment instance instantiated at step 910 (FIG. 9).

As described above, information required for generating the application modeling data 212 may alternately, or in addition, be collected with one or more application programming interface hooks. FIG. 12 depicts example steps for active auto-modeling using application programming interface hooks in accordance with an embodiment of the invention. At step 1202, one or more auto-modeling associated databases and/or rulebases may be updated from the auto-modeling repository 702 (FIG. 7). For example, the database updater 610 (FIG. 6) of the terminal services auto-modeling plug-in 602 may update the hook specification database 608 from the hook specification database 710 at the auto-modeling repository 702. Step 1202 may incorporate steps similar to steps 902, 904 and/or 908 described above with reference to FIG. 9.

At step 1204, one or more application programming interface (API) hooks may be inserted. For example, the hook manager 606 (FIG. 6) of the terminal services auto-modeling plug-in 602 may insert one or more application programming hooks into one or more application programming interface elements as specified by one or more entries in the hook specification database 608. In particular, the application programming interface elements into which application programming interface hooks are inserted (i.e., the hooked application programming interface elements) may include elements of application programming interfaces required by the application installer 204 (FIG. 2) to install the application 206.

At step 1206, a procedure incorporating steps depicted by FIG. 12 may wait for a call to one of the hooked application programming interface elements. For example, the procedure may wait for one of the application programming interface calls made by the application installer 204 (FIG. 2) to install the application 206. As will be apparent to one of skill in the art, the wait need not occur in an independent thread of execution, and may correspond to a thread of execution of the calling application encountering the application programming interface hook or intercept point.

A particular class of calls (e.g., as determined by call parameters) to a particular set of application programming interface elements (e.g., as specified by the hook specification database 608 of FIG. 6) may indicate that installation of the application 206 has finished. For example a call to an operating system application programming interface to exit the application installer 204 may indicate that installation of the application 206 has finished. At step 1208, it may be determined whether installation has finished. For example, the terminal services auto-modeling plug-in 602 may intercept a call to one of the hooked application programming interface elements that indicates that installation of the application 206 has finished. If it is determined that the installation has finished, the procedure may progress to step 1210. Otherwise, the procedure may progress to step 1212.

At step 1212, the call data collection 614 may be updated. For example, the terminal service auto-modeling plug-in 602 (FIG. 6) may update the call data collection 614 with one or more parameters of the most recently intercepted application programming interface call. The call parameters and/or other suitable call data to be collected from the intercepted application programming interface call may be specified by the hook specification database 608 and, in particular, by elements of the hook specification database 608 corresponding the application programming interface hook that intercepted the application programming interface call. Having updated the call data collection 614, the procedure may return to step 1206 to wait for the next application programming interface call.

At some point, it will be determined at step 1208 that the installation has finished, by means of an installation timeout if not otherwise, and the procedure may progress to step 1210. At step 1210, the application programming interface hooks inserted at step 1204 may be removed. For example, the hook manager 606 of the terminal services auto-modeling plug-in 602 (FIG. 6) may track application programming interface hooks inserted at step 1204 and remove them at step 1210.

At step 1214, the call data collection 614 (FIG. 6) may be transformed. For example, the call data transformer 616 may transform the call data collection 614 into one or more data structures suitable for input to the application modeling data formatter 618. At step 1216, the application modeling data 212 (FIG. 2) for the application 206 may be generated. For example, the application modeling data formatter 618 may generate the application modeling data 212 by formatting the transformed call data collection 614 into an appropriate application modeling data format.

Figure 13:
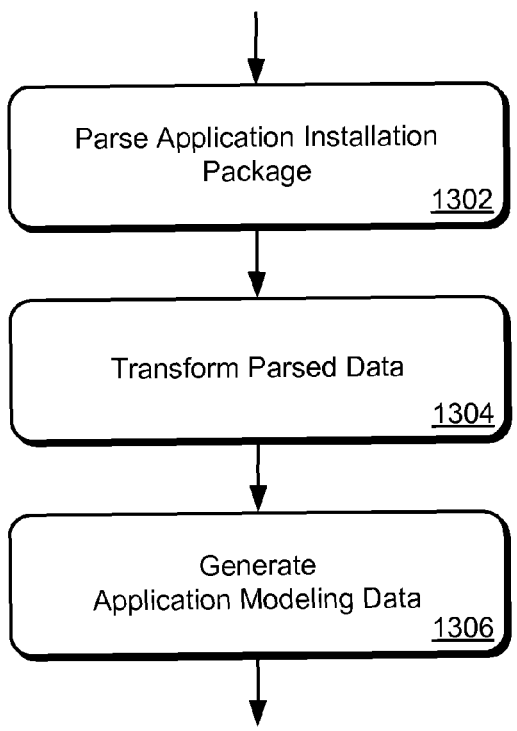
FIG. 13 is a flowchart depicting example steps for passive auto-modeling in accordance with an embodiment of the invention.

As described above, it may be that active auto-modeling is unnecessary and that passive auto-modeling is an option. FIG. 13 depicts example steps for passive auto-modeling in accordance with an embodiment of the invention. For example, the steps depicted in FIG. 13 may be used to passively generate application modeling data 212 (FIG. 2) for the application 206 that corresponds to application modeling data generated by active modeling and/or auto-modeling.

At step 1302, the application installation package 208 (FIG. 2) may be parsed for data suitable for generating corresponding application modeling data 212. For example, the application installation package 208 may be parsed by one or more application installation package parsers 504 (FIG. 5) of the passive auto-modeling module 502. At step 1304, the parsed data may be transformed. For example, the parsed data transformer 510 may transform the parsed data into one or more data structures suitable for input to the application modeling data formatter 512. At step 1306, the application modeling data 212 may be generated. For example, the application modeling data formatter 512 may generate the application modeling data 212 by suitably formatting the transformed data output by the parsed data transformer 510.

Figure 14:
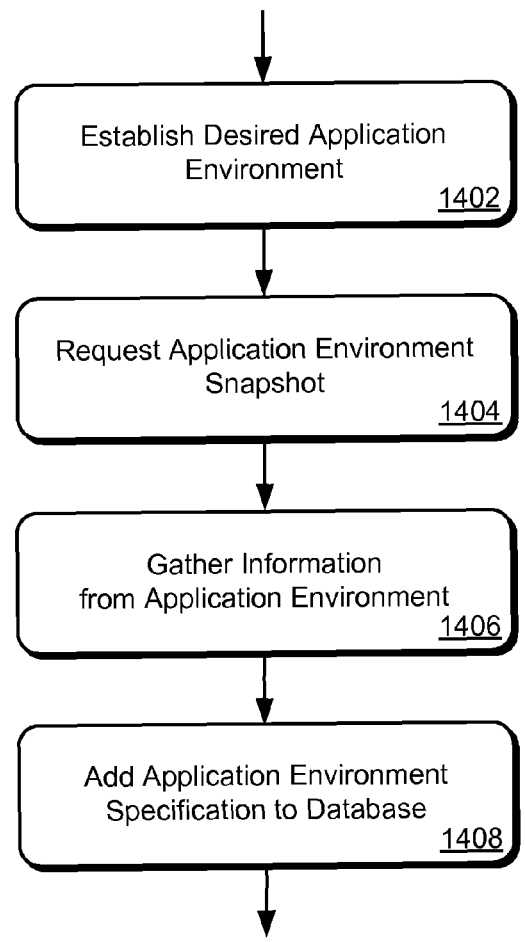
FIG. 14 is a flowchart depicting example steps for creating an application environment specification in accordance with an embodiment of the invention.

As described above, it may be desirable to instantiate a particular application environment for active auto-modeling. Application environments may be specified by application environment specifications 228 (FIG. 2), and application environment specifications 228 may be automatically created for given application environments. FIG. 14 depicts example steps for automatically creating an application environment specification in accordance with an embodiment of the invention.

At step 1402, a desired application environment may be established. For example, a user of the server 202 (FIG. 2) may configure the server 202 to have the desired application environment. Alternatively, the desired application environment may be established at a computer 102, 104, 106, 108 (FIG. 1) independent of the server 202. In another alternative, the desired application environment may be a distributed application environment incorporating several computers 102, 104, 106, 108 and/or network 110 elements.

At step 1404, an application environment snapshot may be requested. For example, the user of the server 202 (FIG. 2) may request that a new one of the application environment specifications 228 be created for the application environment established at step 1402. The application environment baseline module 222 may include facilities to receive and process such requests. The request may include a label for the desired application environment.

At step 1406, information required to create the new one of the application environment specifications 228 (FIG. 2) may be gathered from the desired application environment. For example, the application environment baseline module 222 may gather the information from the application environment established at step 1402. The information to be gathered from the application environment may be specified by the application environment snapshot inventory 232.

At step 1408, a new application environment specification corresponding to the desired application environment may be added to the application environment database 226 (FIG. 2). For example, the application environment baseline module 222 may create a new one of the application environment specifications 228 with the information gathered at step 1406. The new one of the application environment specifications 228 may be associated with a label corresponding to the label provided with the request of step 1404. Each of the application environment specifications 228 may be associated with a unique identifier.

Figure 15:
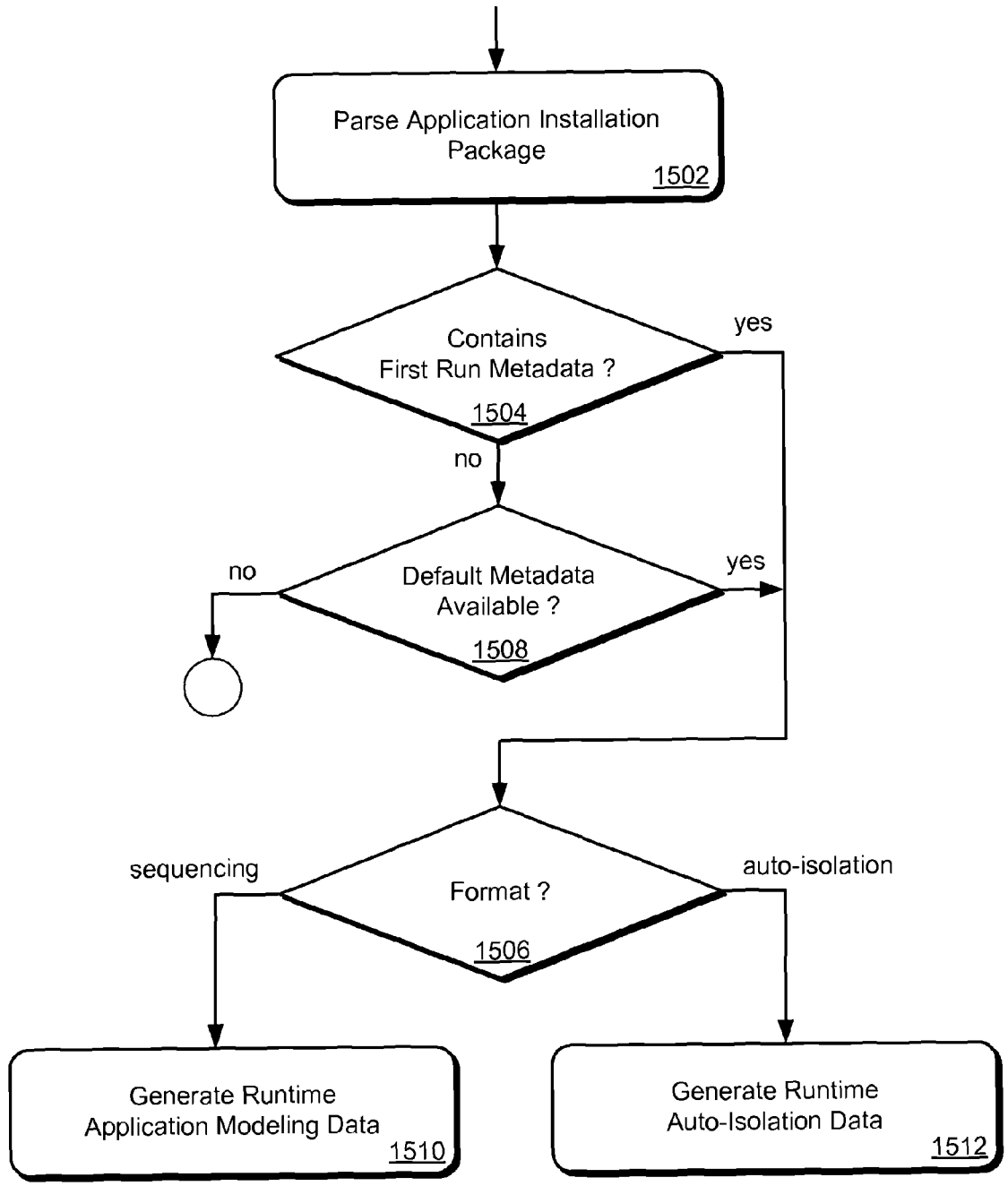
FIG. 15 is a flowchart depicting example steps for passive runtime auto-modeling in accordance with an embodiment of the invention.

As described above, higher quality application virtualization may at times be achieved if auto-modeling accounts not only for application environment changes made during application installation, but also for changes made during one or more initial or first runs of the application 206 (FIG. 2), that is, if auto-modeling includes a runtime auto-modeling component. Furthermore, it may be desirable to avoid actually running the application 206, even during active auto-modeling, that is, that the runtime auto-modeling be passive. FIG. 15 depicts example steps for passive runtime auto-modeling in accordance with an embodiment of the invention.

At step 1502, the application installation package 208 (FIG. 2) may be parsed. For example, the auto-modeling agent 220 may parse the application installation package 208 for runtime auto-modeling (i.e., "first run") metadata. The application installation package 208 may include explicit first run metadata. The application installation package 208 may include implicit first run metadata that requires extraction at step 1502. Alternately, the application installation package 208 may fail to include sufficient first run metadata.

At step 1504, it may be determined if the application installation package 208 (FIG. 2) includes sufficient first run metadata. For example, the auto-modeling agent 220 may determine if the application installation package 208 includes sufficient first run metadata based on one or more results of the parsing of step 1502. If it is determined that the application installation package 208 includes sufficient first run metadata, a procedure incorporating steps depicted in FIG. 15 may progress to step 1506. Otherwise, the procedure may progress to step 1508.

If the application installation package 208 (FIG. 2) fails to include sufficient first run metadata, default first run metadata (including supplementary default first run metadata) may be obtained from one or more alternate sources. The runtime auto-isolation policy 234 may specify default first run metadata. The runtime auto-isolation policy 234 may further specify one or more alternate sources of default first run metadata. At step 1508, it may be determined if default first run metadata is available. For example, the auto-modeling agent 220 may check the runtime auto-isolation policy 234 for default first run metadata and/or one or more alternate sources as specified by the runtime auto-isolation policy 234. If it is determined that default first run metadata is available, the procedure may progress to step 1506. Otherwise, passive runtime auto-modeling may not continue, and the procedure may progress to steps other than those depicted in FIG. 15.

Additional runtime application modeling data may be generated for the application modeling data 212 (FIG. 2) based on the first run metadata. Alternatively, runtime auto-isolation data 236 independent of the application modeling data 212 may be generated based on the first run metadata. The runtime auto-isolation policy 234 may specify which type (or format) of runtime application modeling data to generate. At step 1506, the format of runtime application modeling data to generate may be determined. For example, the auto-modeling agent 220 may determine which runtime application modeling data format to generate in accordance with the runtime auto-isolation policy 234. If it is determined that additional runtime application modeling data is to be generated for the application modeling data 212, the procedure may progress to step 1510. Otherwise, the procedure may progress to step 1512.

At step 1510, additional runtime application modeling data may be generated for the application modeling data 212 (FIG. 2). For example, the auto-modeling agent 220 may generate the additional runtime application modeling data based on the first run metadata including parsed and/or default first run metadata. The auto-modeling agent 220 may use passive auto-modeling module 502 (FIG. 5) functionality to generate the additional runtime application modeling data including functionality of the application installation package parsers 504, the parsed data transformer 510 and/or the application modeling data transformer 512.

At step 1512, the runtime auto-isolation data 236 (FIG. 2) may be generated. For example, the auto-modeling agent 220 may generate the runtime auto-isolation data 236 based on the first run metadata including parsed and/or default first run metadata. The auto-modeling agent 220 may utilize functionality corresponding to the application installation package parsers 504 (FIG. 5), the parsed data transformer 510 and/or the application modeling data transformer 512 of the passive auto-modeling module 502 to generate the runtime auto-isolation data 236.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to an embodiment of the invention.

Preferred embodiments of the invention are described herein, including the best mode known to the inventors for carrying out the invention. Variations of those preferred embodiments may become apparent to those of ordinary skill in the art upon reading the specification. The inventors expect skilled artisans to employ such variations as appropriate, and the inventors intend for the invention to be practiced otherwise than as explicitly described herein. Accordingly, embodiments of the invention include all modifications and equivalents of the subject matter recited in the following claims as permitted by applicable law.

The invention claimed is:

1. A method comprising:
   installing, by a computing device, at least one application in an application environment; and
   modeling, by the computing device, the at least one application for virtualization, the modeling comprising:
      monitoring one or more calls to one or more application programming interfaces during the installation of the at least one application; and
      using data of the one or more calls to generate application modeling data for virtualization of the at least one application.

2. The method of claim 1, wherein the modeling the at least one application begins in response to beginning to install the at least one application.

3. The method of claim 1, further comprising:
   instantiating the application environment independent of an application environment associated with a computer operating system.

4. The method of claim 3, wherein the application environment is instantiated based on, at least, an application environment specification.

5. The method of claim 4, wherein the application environment specification comprises a baseline application environment specification.

6. The method of claim 5, further comprising:
   updating the baseline application environment specification to include the at least one application.

7. A computer-implemented system comprising:
   one or more processors; and
   memory communicatively coupled to the one or more processors, the memory comprising:
      an application installer executable by the one or more processors to install at least one application in an application environment;
      an application modeler executable by the one or more processors to at least partially model the at least one application for virtualization, wherein the at least partial modeling comprises monitoring one or more calls to one or more application programming interfaces during the installation of the at least one application by the application installer and using data of the one or more calls to generate application modeling data for virtualization of the at least one application; and
      an auto-modeling agent executable by the one or more processors to direct said at least partial modeling.

8. The computer-implemented system of claim 7, wherein the application installer comprises the auto-modeling agent.

9. The computer-implemented system of claim 7, wherein the auto-modeling agent is further executable by the one or more processors to direct the application modeler to begin modeling said at least one application responsive to the application installer beginning to install said at least one application.

10. The computer-implemented system of claim 7, wherein the auto-modeling agent is further executable by the one or more processors to direct the modeling based on an auto-modeling rulebase.

11. The computer-implemented system of claim 10, wherein the auto-modeling agent comprises a rulebase updater configured to, at least, update the auto-modeling rulebase from an auto-modeling repository.

12. The computer-implemented system of claim 11, wherein the rulebase updater accesses the auto-modeling repository through a public computer network.

13. The computer-implemented system of claim 7, wherein the system further comprises:
   an application environment associated with a computer operating system; and
   an application environment baseline component executable by the one or more processors to instantiate the application environment independent of the application environment associated with the computer operating system.

14. The computer-implemented system of claim 13, wherein:
   the system further comprises at least one application environment specification; and
   the application environment baseline component is executable by the one or more processors to instantiate the application environment based on, at least, said at least one application environment specification.

15. The computer-implemented system of claim 14, wherein said at least one application environment specification comprises a baseline application environment specification.

16. The computer-implemented system of claim 15, wherein the application environment baseline component is executable by the one or more processors to update the baseline application environment specification to include said at least one application.

17. The computer-implemented system of claim 7, wherein the system further comprises:
   the application environment into which said at least one application is to be installed; and
   a terminal services component having an install mode insulating the application modeler from detecting changes to the application environment unrelated to installation of said at least one application.

18. One or more computer-readable storage memory to store instructions that are executable by one or more processors to:
   receive a request to install an application;
   determine whether to perform active auto-modeling or passive auto-modeling based on, in part, a classification of an application installation package associated with the application, the classification of the application installation package being determined from at least one of a package signature of the application installation package or one or more package classification rules that specify whether to classify the application installation package for active auto-modeling or passive auto-modeling;

in response to determining to perform the active auto-modeling,
- identify application programming interfaces that are used to install an application;
- install the application;
- collect call data during the installation of the application via the identified application programming interfaces; and
- model the application for virtualization based on the collected call data.

19. The one or more computer-readable storage memory of claim 18, wherein the instructions are further executable by the one or more processors to collect the call data via application programming interface hooks that intercept one or more calls to the application programming interfaces by an application installer.

\* \* \* \* \*